US008228678B2

(12) United States Patent
Hasegawa et al.

(10) Patent No.: US 8,228,678 B2
(45) Date of Patent: Jul. 24, 2012

(54) PORTABLE ELECTRONIC APPARATUS

(75) Inventors: Takashi Hasegawa, Kanagawa (JP); Motonori Imamura, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 235 days.

(21) Appl. No.: 12/740,321

(22) PCT Filed: Oct. 30, 2008

(86) PCT No.: PCT/JP2008/069812
§ 371 (c)(1),
(2), (4) Date: Jun. 1, 2010

(87) PCT Pub. No.: WO2009/057720
PCT Pub. Date: May 7, 2009

(65) Prior Publication Data
US 2010/0254110 A1 Oct. 7, 2010

(30) Foreign Application Priority Data

Oct. 30, 2007 (JP) ................... 2007-282102
Oct. 30, 2007 (JP) ................... 2007-282103

(51) Int. Cl.
*H05K 7/16* (2006.01)
(52) U.S. Cl. ................ 361/755; 361/679.27; 455/575.3; 16/366
(58) Field of Classification Search .................. 361/755, 361/679.27, 679.28; 455/575.1, 575.3; 379/433.13; 16/366, 367
See application file for complete search history.

(56) References Cited

U.S. PATENT DOCUMENTS

| 5,799,079 | A | 8/1998 | Inoue |
| 7,168,135 | B2 * | 1/2007 | Jung et al. ................ 16/367 |
| 7,386,330 | B2 * | 6/2008 | Takagi ................. 455/575.3 |
| 7,559,117 | B2 * | 7/2009 | Chien ................. 16/367 |
| 7,600,298 | B2 * | 10/2009 | Chen et al. ................. 16/367 |
| 7,725,989 | B2 * | 6/2010 | Huang et al. ................. 16/367 |
| 7,844,050 | B2 * | 11/2010 | Hwang et al. ............. 379/433.13 |
| 7,949,312 | B2 * | 5/2011 | Takagi ................. 455/90.3 |

(Continued)

FOREIGN PATENT DOCUMENTS

| JP | 09-153931 | 6/1997 |
| JP | 2001-267762 | 9/2001 |
| JP | 2003-158563 | 5/2003 |
| JP | 2003-174495 | 6/2003 |
| JP | 2004-218688 | 8/2004 |

(Continued)

*Primary Examiner* — Dameon Levi
(74) *Attorney, Agent, or Firm* — Procopio, Cory, Hargreaves & Savitch LLP

(57) ABSTRACT

A portable electronic apparatus having a first case, a second case, and a two-axis hinge mechanism. Positional misalignment between both cases can be easily prevented without relying only on dimensional precision of the components of the two-axis hinge mechanism. The portable electronic apparatus has a hinge (4) for interconnecting the first and second cases so that they can be opened and closed about a first rotation axis (X) and at the same time interconnecting the first and second cases so that they can pivot about a second rotation axis (Y). The hinge (4) has a first case fixing component (122) fixed to the first case, a first connection component (452) connected to the first case fixing component (122) so as to be rotatable about the second rotation axis (Y), and a second connection component (461) connected to the second case so as to be rotatable about the first rotation axis (X). The first connection component (452) and the second connection component (461) are connected to each other with a screw. The degree of tightening of the screw for connecting the first connection component (452) and the second connection component (461) together can be changed when the first and second cases are closed by folding them about the first rotation axis (X).

14 Claims, 28 Drawing Sheets

U.S. PATENT DOCUMENTS

| | | |
|---|---|---|
| 7,984,533 B2 * | 7/2011 | Wei et al. .................. 16/367 |
| 2003/0040288 A1 * | 2/2003 | Kang et al. .................. 455/90 |
| 2005/0245294 A1 * | 11/2005 | Gupte et al. ............... 455/575.1 |
| 2006/0135225 A1 * | 6/2006 | Lin et al. ................... 455/575.3 |
| 2006/0293095 A1 | 12/2006 | Takagi |
| 2007/0123319 A1 * | 5/2007 | Hwang ..................... 455/575.1 |
| 2010/0248790 A1 * | 9/2010 | Motonori et al. ............ 455/566 |
| 2010/0254076 A1 * | 10/2010 | Hasegawa et al. ....... 361/679.01 |
| 2010/0267426 A1 * | 10/2010 | Kang et al. ................ 455/575.1 |

FOREIGN PATENT DOCUMENTS

| | | |
|---|---|---|
| JP | 2005-299835 | 10/2005 |
| JP | 2005-311004 | 11/2005 |
| JP | 2005-333323 | 12/2005 |
| JP | 2006-010025 | 1/2006 |
| JP | 2007-003009 | 1/2007 |
| JP | 2007-0030099 | 1/2007 |
| JP | 2007-009965 | 8/2007 |
| JP | 2006-125560 | 5/2008 |

* cited by examiner

PORTABLE ELECTRONIC APPARATUS

TECHNICAL FIELD

The present invention relates to a mobile communication machine such as a cellular telephone, a personal mobile phone and the like or a portable electronic apparatus such as a PDA (Personal Digital Assistants) and particularly to a folding type portable electronic apparatus configured to be capable of folding.

BACKGROUND ART

Recently, with regard to a cellular telephone, which is one portable electronic apparatus, various forms such as a folding type in which bodies constituting a display unit and an operation unit are formed separately and a display unit side body as a cover body is connected to an operation unit side body so as to be openable and closable and a sliding type in which the display unit side body is slidably connected to the operation unit side body are proposed in addition to an integral cellular telephone (so-called straight type) in which the display unit and the operation unit are constituted by a single body.

For example, with the folding type cellular telephone, a liquid crystal display screen disposed on the display unit side body can be enlarged by configuring the display unit side body separately from the operation side body and the telephone can be carried compactly by folding the both bodies while not in use.

In addition, in recent folding type cellular telephones, further to the trend towards multiple and higher functions such as a TV tuner mounted thereon, a cellular telephone with bodies not only openable and closable, but also rotatable or the like by using a biaxial hinge mechanism has been put into practical use.

In a folding type cellular telephone constituted as above, since the display unit side body is connected to the operation unit side body so as to be openable and closable, an extended angle in an extended state needs to be regulated.

For that purpose, in a folding type cellular telephone having a biaxial hinge mechanism, a cellular telephone has been disclosed with a projection portion for abutment disposed on each body so that extension larger than a certain angle can be regulated in the extended state (see Patent Document 1, for example).

Alternatively, in a cellular telephone provided with the biaxial hinge mechanism, for the purpose of reducing a thickness or a size of the cellular telephone, a biaxial hinge portion in which a first hinge component for opening and closing and a second hinge component for rotation are configured integrally as the biaxial hinge mechanism is used (see Patent Documents 2 to 5, for example).

[Patent Document 1] Japanese Unexamined Patent Application, First Publication No. 2005-299835

[Patent Document 2] Japanese Unexamined Patent Application, First Publication No. 2004-218688

[Patent Document 3] Japanese Unexamined Patent Application, First Publication No. 2005-311004

[Patent Document 4] Japanese Unexamined Patent Application, First Publication No. 2006-10025

[Patent Document 5] Japanese Unexamined Patent Application, First Publication No. 2003-174495

DISCLOSURE OF THE INVENTION

Problems to be Solved by the Invention

In a cellular telephone provided with a first body and a second body, positional misalignment between a tip portion of the first body and a tip portion of the second body needs to be suppressed in view of appearance specification.

However, the integrally configured biaxial hinge portion has many components relating to the positional misalignment, and positional misalignment can easily occur due to a fluctuation in the dimensions of each component or the like.

It is difficult to suppress the positional misalignment only by an improvement in dimensional accuracy of the components, and methods such as selection and delivery of components and an intentional provision of structural looseness so as to make positional misalignment inconspicuous and to correct the positions of tip portions of both bodies by an outer case or the like are employed.

However, these methods have defects such as disadvantages in component costs and responsiveness to a short delivery period and great looseness in the body, which degrades the product, and the like.

Such defects can be similarly caused in portable electronic apparatuses other than cellular telephones.

The present invention was made in view of the above problems and an object thereof is to provide a portable electronic apparatus including a first body and a second body and also including a biaxial hinge mechanism which connects the first body and the second body so as to be openable and closable about a first rotational axis and to be rotatable about a second rotational axis orthogonal to the first rotational axis, which can easily prevent positional misalignment between both bodies without relying only on the dimensional accuracy of components of the biaxial hinge mechanism.

Means for Solving the Problems

The present invention relates to A portable electronic apparatus including: a first body; a second body; and a hinge portion that connects the first body and the second body so as to be openable and closable around a first rotational axis and to be rotatable around a second rotational axis orthogonal to the first rotational axis, in which the hinge portion includes a first body fixing component fixed to the first body, a first connecting component connected to the first body fixing component so as to be rotatable around the second rotational axis, and a second connecting component connected to the second body so as to be rotatable around the first rotational axis and is configured by the first connecting component and the second connecting component connected to each other by screwing; and in a closed state in which the first body and the second body are folded with respect to the first rotational axis, a degree of fastening a screw connecting the first connecting component and the second connecting component can be changed.

In addition, it is preferred that a correcting means for correcting a positional relationship of the first connecting component and the second connecting component by changing a degree of fastening of the screw is formed on at least either one of an abutting portion of the second connecting component with the first connecting component and an abutting portion of the first connecting component and the second connecting component.

In addition, it is preferred that the first connecting component and the second connecting component are connected by way of fixing by threads in at least two symmetric positions about an axial direction of the second rotational axis.

In addition, it is preferred that: the first body fixing component and the first connecting component are preferably formed by sheet-metal working; and the second connecting component is formed by die casting or metal sintering.

In addition, it is preferred that the hinge portion has an open portion in which an insertion portion of the screw is opened and the open portion is preferably covered by a cover member.

In addition, it is preferred that: a hole portion through which male threads used for the fixing by threads penetrate and the open portion are formed in the second connecting component; female threads that match the male threads are formed in the first connecting component; and the first connecting component and the second connecting component are connected to each other by inserting the male threads into the hole portion through the open portion of the second connecting component and threading into the female threads of the first connecting component.

In addition, it is preferred that a cable, which electrically connects an electronic component in the first body and an electronic component in the second body, is further provided, in which: the second rotational axis is located at a connection portion of the first body fixing component and the first connecting component; the cable is inserted into the connection portion and has a connector at an end portion on a side of the second body in the cable; the open portion of the second connecting component has a size that allows the connector to be inserted therethrough; the second connecting component is cylindrical and has a rotating component, which biases the second body in a direction to open the first body about the first rotational axis, fixed on one end side of the second connecting component, and has an opening on an other side of the second connecting component; and a continuous space through which the connector is inserted is formed in a space from the opening to the open portion.

In addition, it is preferred that the open portion is formed at a position not obstructed by the first body and the second body in the second connecting component, in the closed state.

In addition, it is preferred that the screw insertion direction in the fixing by threads matches a direction in which the first body and the second body overlap.

In addition, it is preferred that: the hinge portion is covered by a cover member; the second body has, at its end portion, a first bearing portion and a second bearing portion at the end portions thereof that separately protrude and pivotally support the second connecting component rotatably about the first rotational axis; the second body has a fitting portion between the first bearing portion and the second bearing portion, in which the hinge portion covered by the cover member is disposed; on surfaces of the fitting portion and the cover member, a first abutment portion and a second abutment portion brought into contact in the open state are formed, respectively; and at least a part of the back side of the second abutment portion in the cover member is formed to be capable of abutting at least either one of the first connecting component and the second connecting component.

In addition, it is preferred that: a first plane is formed on the first abutment portion; a second plane is formed on the second abutment portion; a third plane is formed on an abutting portion with the back face of the second abutment portion in the first connecting component or the second connecting component; and the first plane, the second plane, and the third plane are formed to be capable of abutting in a state parallel with each other in the open state.

In addition, it is preferred that: the cover member is includes a first cover and a second cover; and the first cover and the second cover are preferably formed to be capable of fitting by a fitting means formed on the first cover and the second cover, respectively, by sandwiching the hinge portion.

In addition, it is preferred that: the first connecting component and the second connecting component are formed to be capable of being assembled; the hinge portion has an adjusting means for adjusting an assembly angle of the first connecting component and the second connecting component; and the fitting means is formed so as to surround the adjusting means.

In addition, it is preferred that: the adjusting means includes a screw for fastening the first connecting component and the second connecting component; and an insertion direction of the screw matches a direction in which the first body and the second body overlap each other in the closed state.

Effects of the Invention

According to the present invention, a portable electronic apparatus can be provided that includes a first body and a second body and also including a biaxial hinge mechanism which connects the first body and the second body so as to be openable and closable about a first rotational axis and to be rotatable about a second rotational axis orthogonal to the first rotational axis, in which positional misalignment between both bodies can be easily prevented without relying only on dimensional accuracy of components of the biaxial hinge mechanism.

PREFERRED MODE FOR CARRYING OUT THE INVENTION

Figure 1:
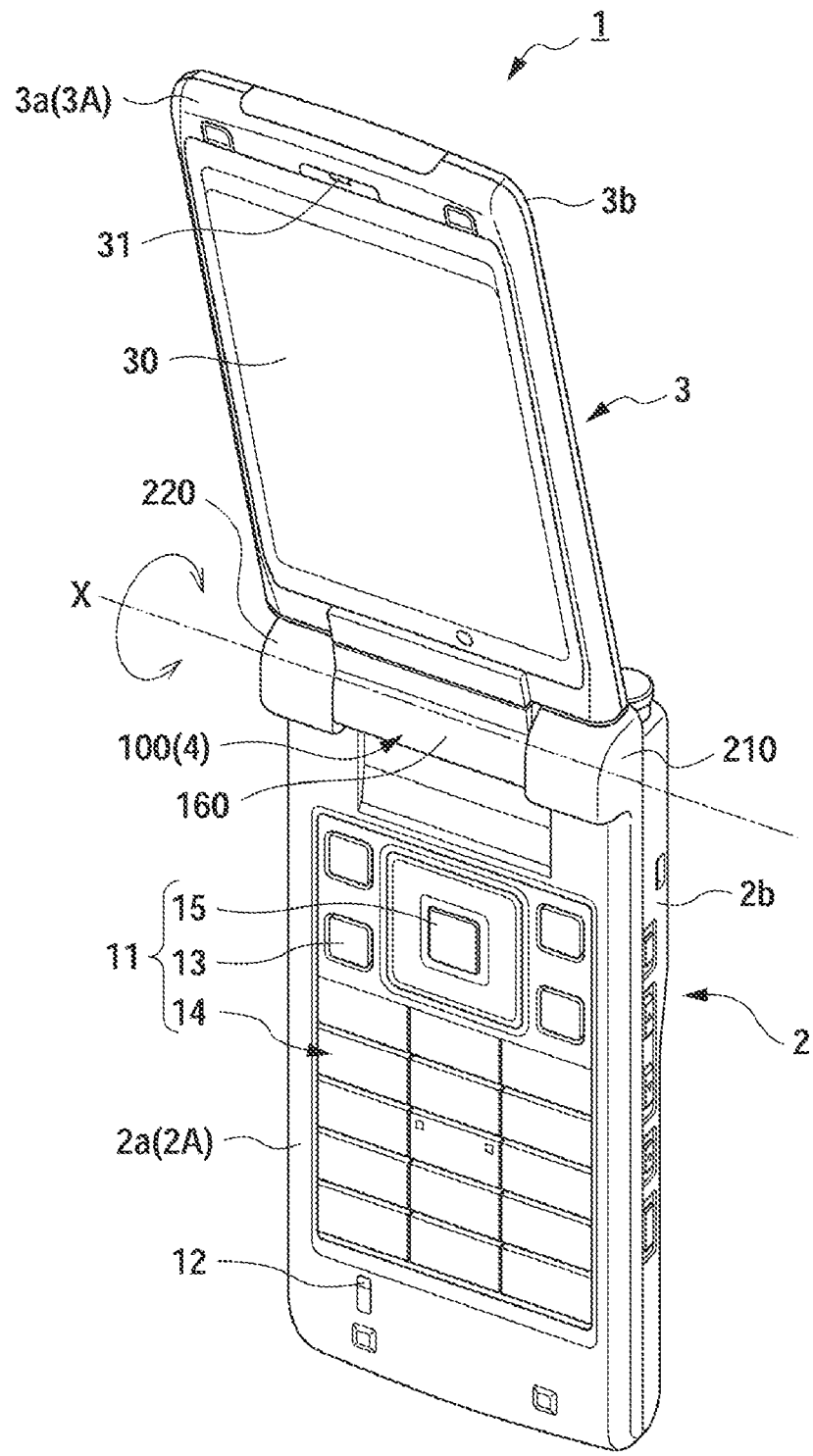
FIG. 1 is a perspective view illustrating a state (first open state) in which a cellular telephone 1 is opened as an embodiment of a portable electronic apparatus of the present invention.

Embodiments of the present invention will be described below referring to the drawings.

Figure 2:
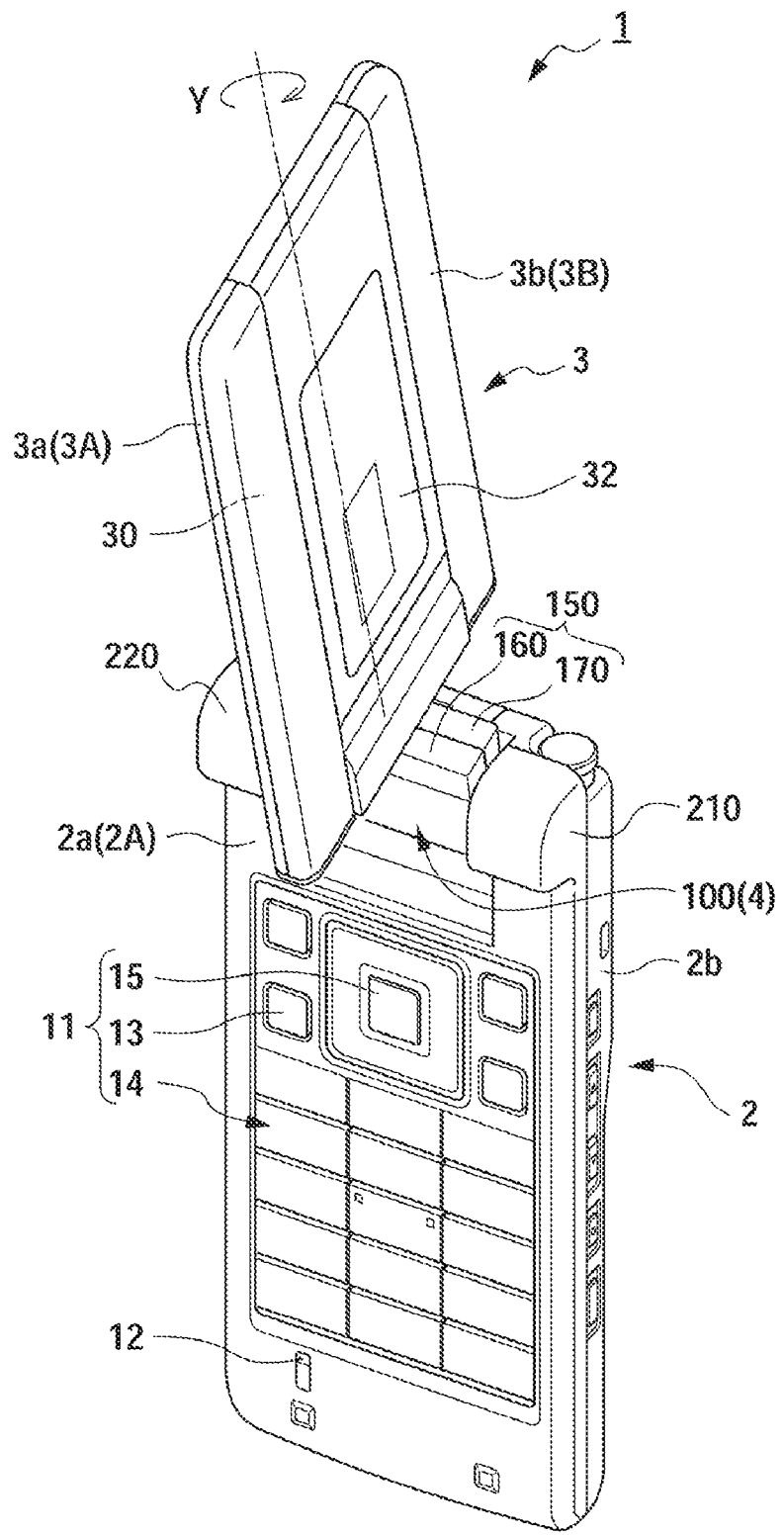
FIG. 2 is a perspective view illustrating a state of the cellular telephone 1 shown in FIG. 1 in which a display unit side body 3 is rotated about a pivot axis Y by a predetermined angle.
Figure 3:
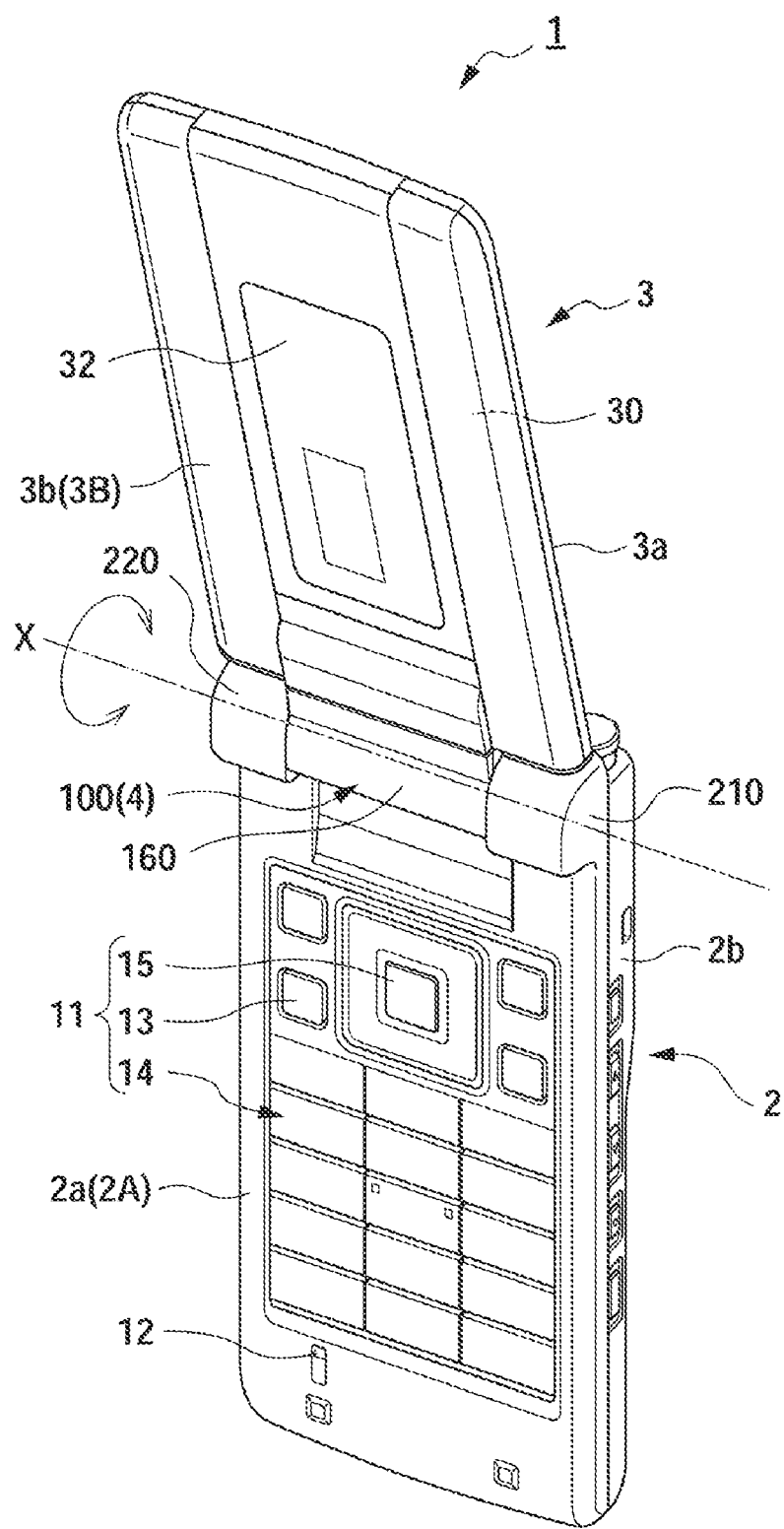
FIG. 3 is a perspective view illustrating a state (second open state) of the cellular telephone 1 shown in FIG. 1 in which the display unit side body 3 is rotated about the pivot axis Y by 180°.
Figure 4:
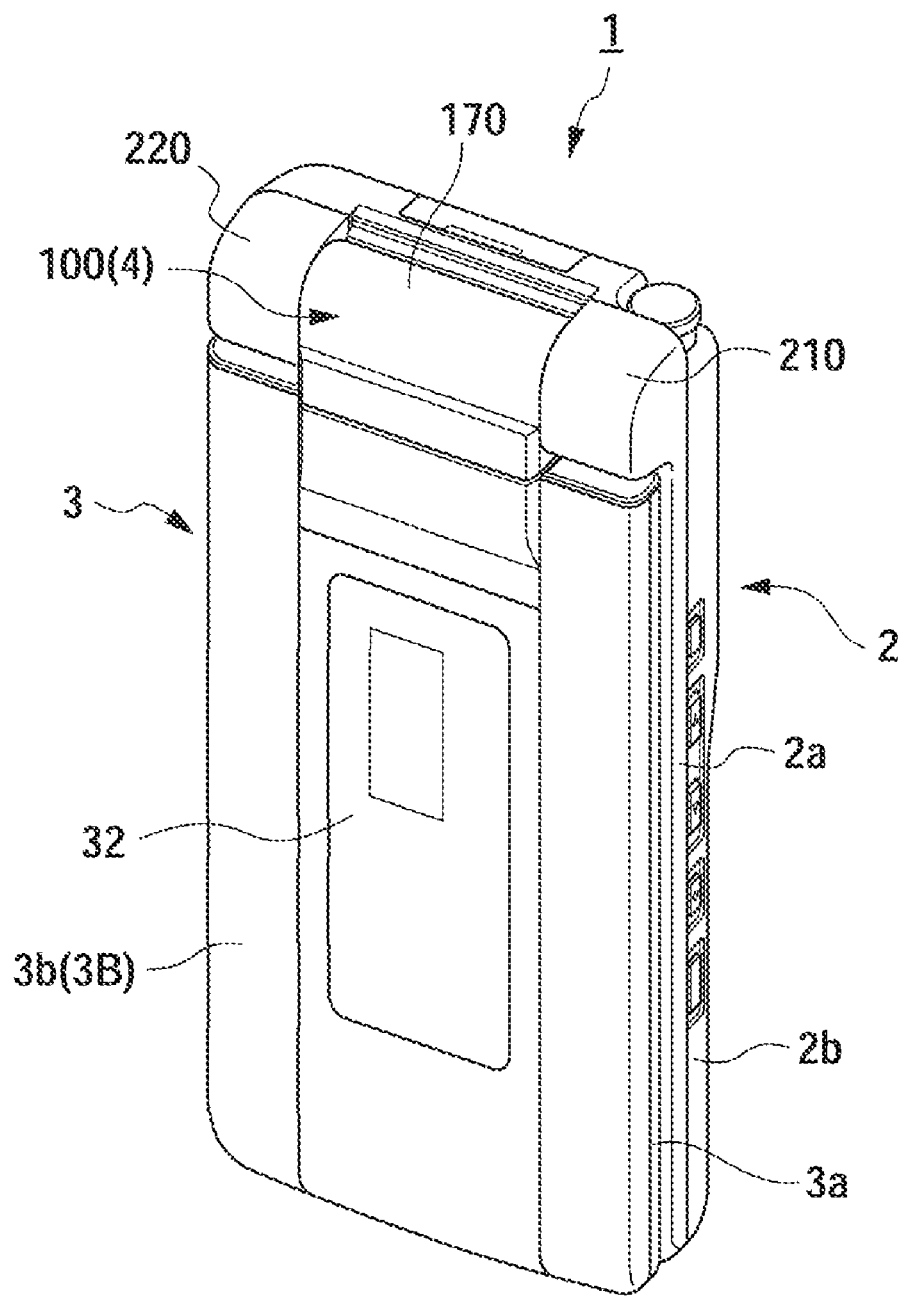
FIG. 4 is a perspective view illustrating a closed state (first closed state) of the cellular telephone 1 shown in FIG. 1.
Figure 5:
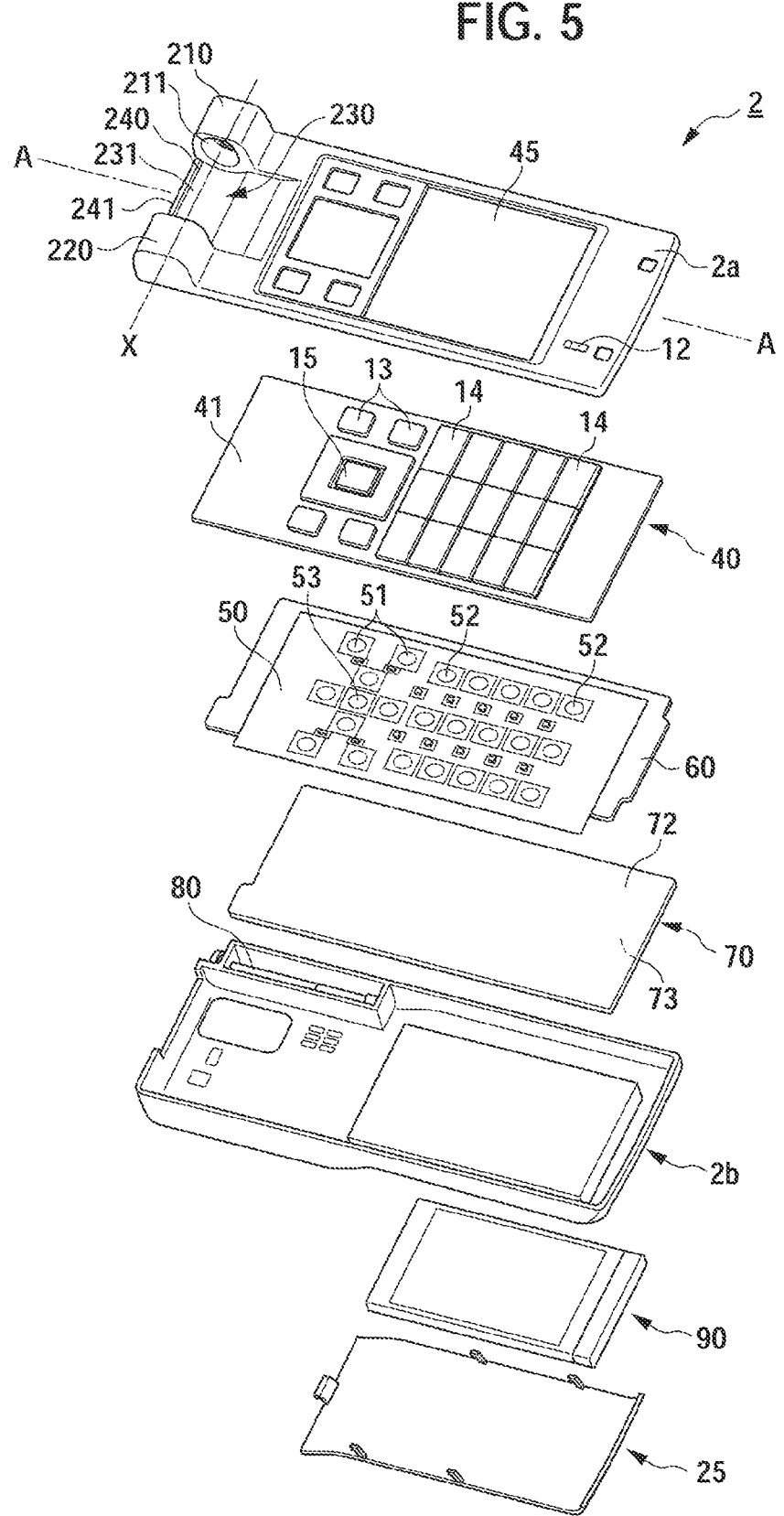
FIG. 5 is an exploded perspective view of an operation unit side body 2.
Figure 6:
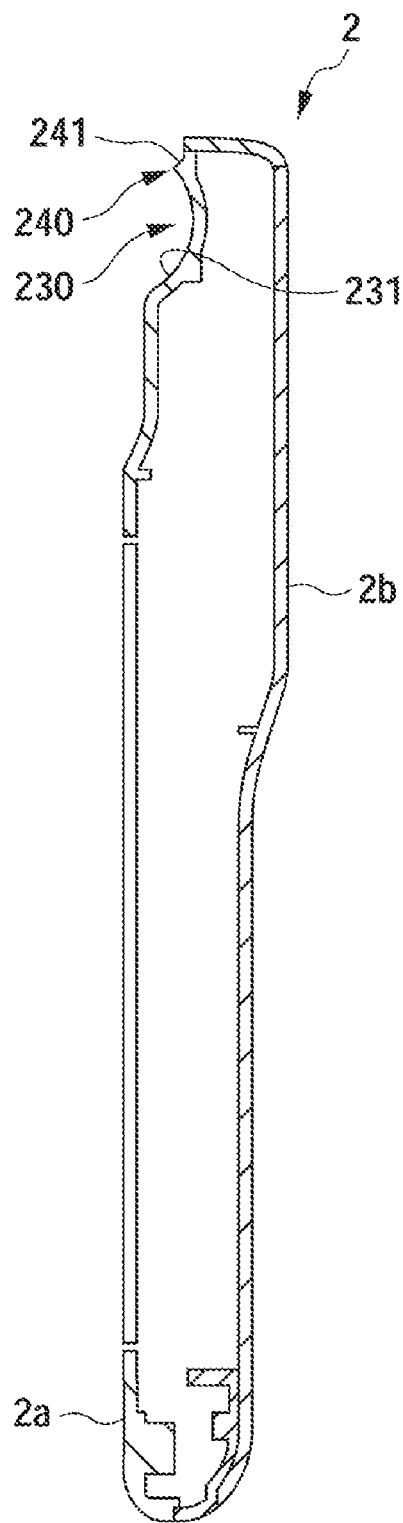
FIG. 6 is an end face view sectioned along the line A-A shown in FIG. 5 of the operation unit side body 2 with the internal structure omitted.
Figure 7:
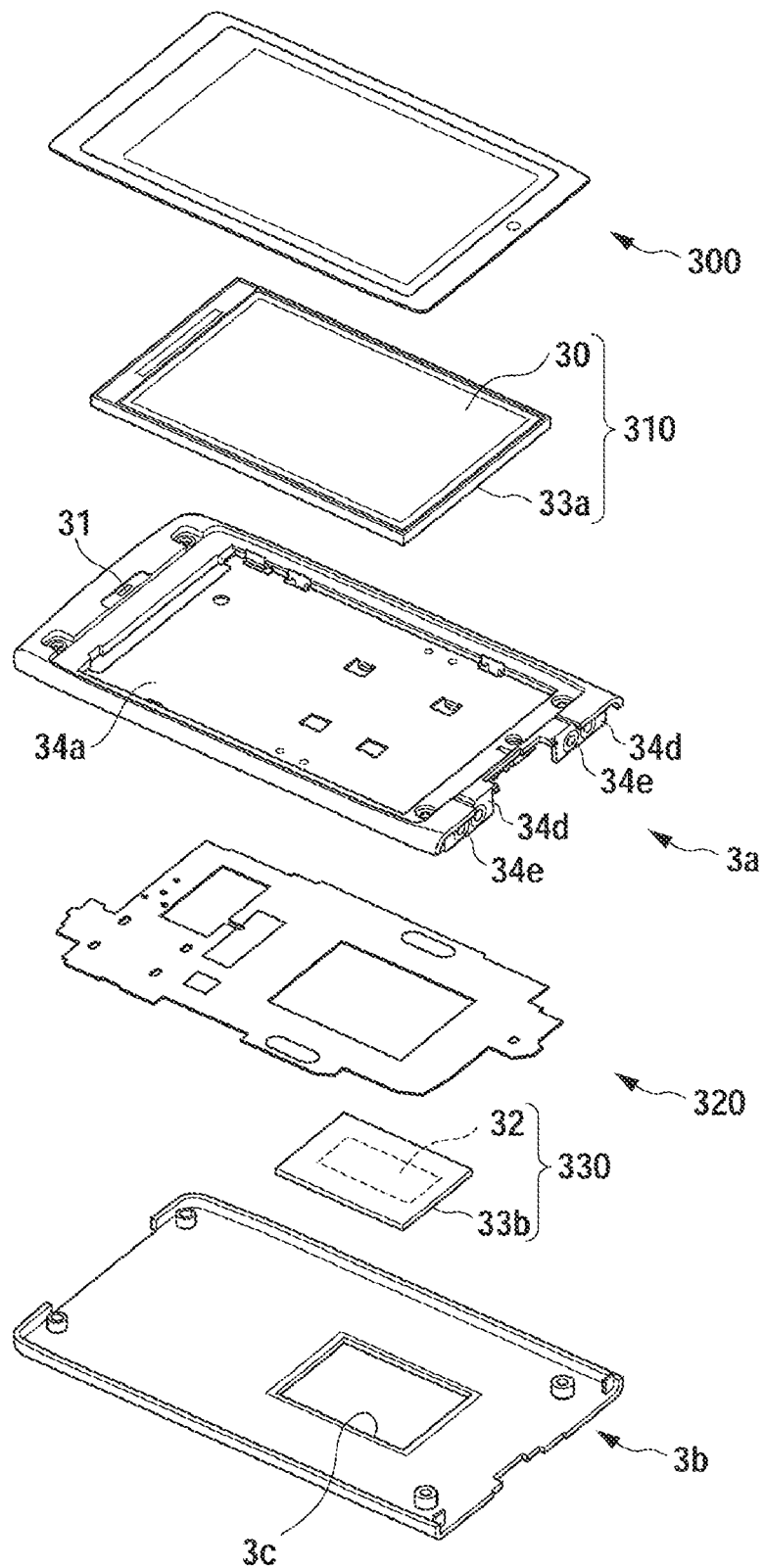
FIG. 7 is an exploded perspective view of the display unit side body 3.
Figure 8:
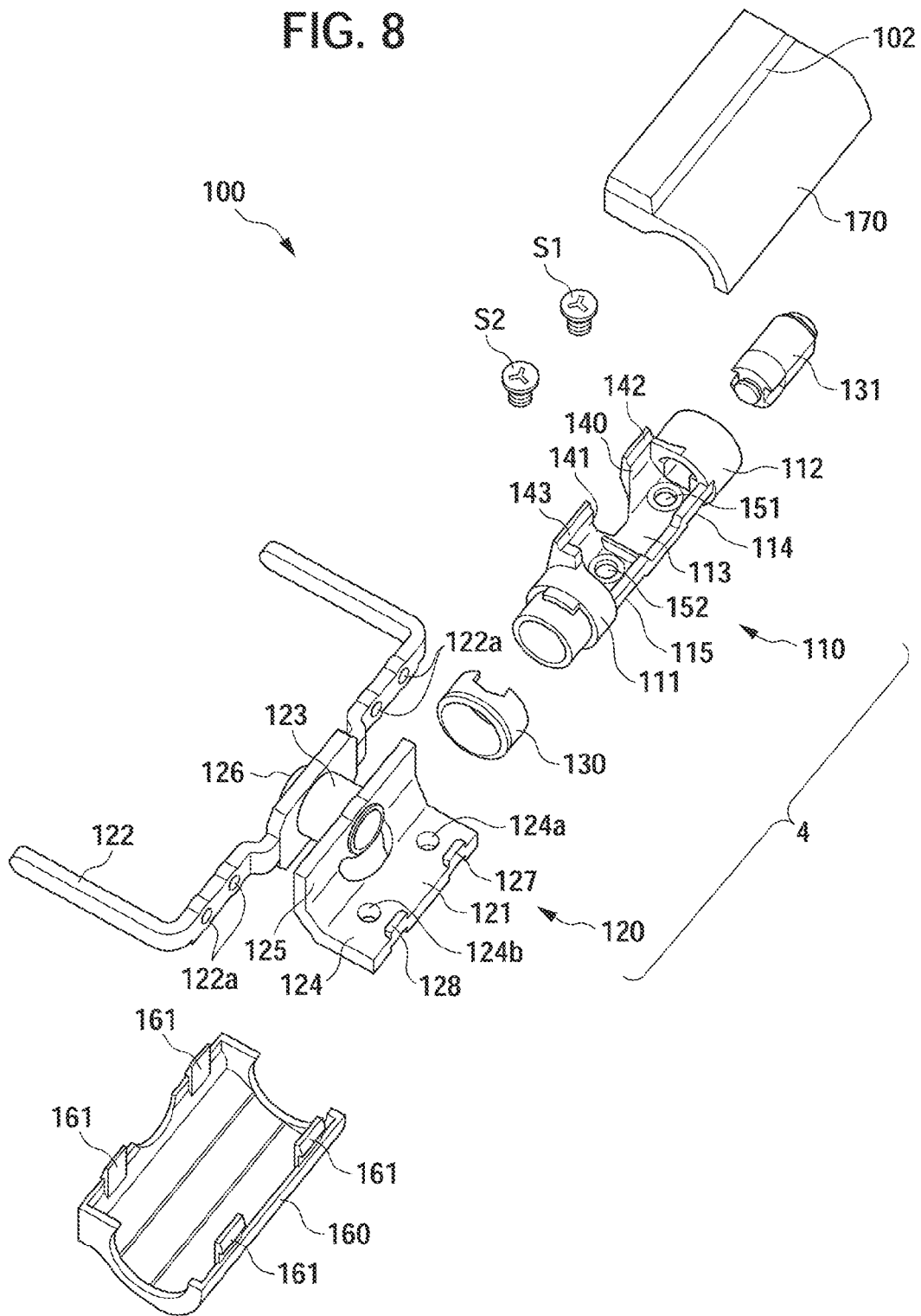
FIG. 8 is an exploded perspective view of a connecting portion 100.
Figure 9A:
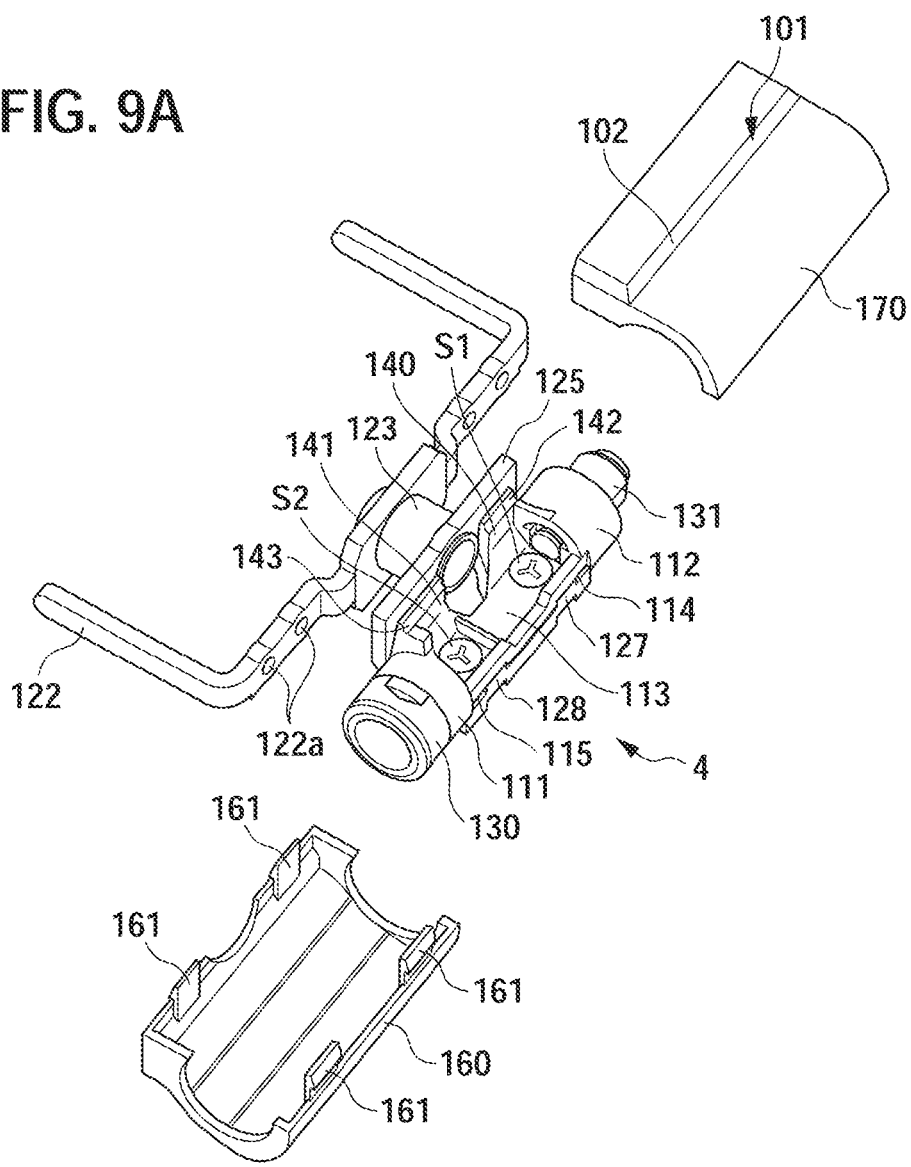
FIG. 9A is an exploded perspective view showing a hinge portion 4 as well as a front cover 160 and a rear cover 170 covering the hinge portion 4.
Figure 9B:
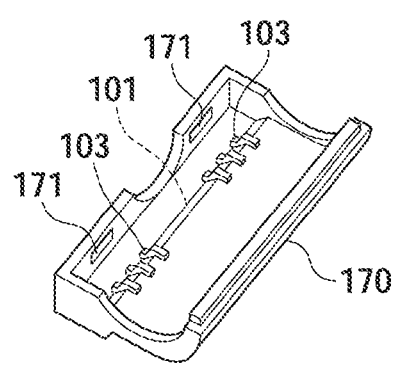
FIG. 9B is a perspective view illustrating a rear face side of the rear cover 170.

First, referring to FIGS. 1 to 4, an overall structure of a cellular telephone 1 as an embodiment of a portable electronic apparatus of the present invention will be described. FIG. 1 is a perspective view illustrating a state (first open state) in which a cellular telephone 1 is opened as an embodiment of a portable electronic apparatus of the present invention. FIG. 2 illustrates a state of the cellular telephone 1 shown in FIG. 1 in which a display unit side body 3 is rotated about a pivot axis Y by a predetermined angle. FIG. 3 is a perspective view illustrating a state (second open state) of the cellular telephone 1 shown in FIG. 1 in which the display unit side body 3 is rotated about the pivot axis Y by 180°. FIG. 4 is a perspective view illustrating a closed state (first closed state) of the cellular telephone 1 shown in FIG. 1. FIG. 5 is an exploded perspective view of an operation unit side body 2. FIG. 6 is an end face view sectioned along the line A-A shown in FIG. 5 of the operation unit side body 2 with an internal structure omitted. FIG. 7 is an exploded perspective view of the display unit side body 3. FIG. 8 is an exploded perspective view of a connecting portion 100. FIG. 9A is an exploded perspective view showing a hinge portion 4 as well as a front cover 160 and a rear cover 170 covering the hinge portion 4. FIG. 9B is a perspective view illustrating a rear face side of the rear cover 170.

As shown in FIGS. 1 to 4, the cellular telephone 1 according to the embodiment includes the operation unit side body 2 as a second body, the display unit side body 3 as a first body, and a connecting portion 100 that connects the operation unit side body 2 and the display unit side body 3. The connecting portion 100 has the hinge portion 4 having a biaxial hinge mechanism. As shown in FIGS. 8 to 9B, the hinge portion 4 includes an opening-and-closing axis member 110 and a rotational axis member 120. The opening-and-closing axis member 110 is an axis member which makes the cellular telephone 1 switchable between an open state and a closed state by rotating the display unit side body 3 about an opening-and-closing axis X, which is a first rotational axis. The rotational axis member 120 is an axis member which makes the cellular telephone 1 switchable between a front side state and a back side state by rotating the display unit side body 3 about a pivot axis Y, which is a second rotational axis. Since the hinge portion 4 has the above configuration, the cellular telephone 1 can be freely transformed by folding into the open state and the closed state and the display unit side body 3 can be switched to the front side state and the back side state in the open state and the closed state, respectively.

That is, the hinge portion 4 includes a "biaxial hinge mechanism which connects the operation unit side body 2 and the display unit side body 3 so as to be openable and closable at an arbitrary angle about the opening-and-closing axis X, which is the first rotational axis, and also to be rotatable at an arbitrary angle about the pivot axis Y, which is the second rotational axis". The pivot axis Y is orthogonal to the opening-and-closing axis X.

Here, the open state refers to a state in which the operation unit side body 2 and the display unit side body 3 are disposed so as not to overlap each other (see FIG. 1). The closed state refers to a state in which the operation unit side body 2 and the display unit side body 3 are disposed so as to overlap each other (not shown). In addition, the front side state refers to a state in which, in the open state, an operation key group 11 disposed on a front case 2a of the operation unit side body 2 and a display 30 disposed on a front case 3a of the display unit side body 3 are disposed so as to face the same side (the first open state, see FIG. 1) or a state in which, in the closed state, the display 30 in the display unit side body 3 and the operation key group 11 in the operation unit side body 2 are disposed so as to oppose each other (first closed state, see FIG. 4). Moreover, the back side state refers to a state in which, in the open state, the operation key group 11 in the operation unit side body 2 and the display 30 in the display unit side body 3 are disposed so as to oppose each other (second open state, see FIG. 3) or a state in which, in the closed state, the display 30 in the display unit side body 3 and the operation key group 11 in the operation unit side body 2 are exposed without opposing each other (second closed state, not shown).

Subsequently, basic structures of the operation unit side body 2, the display unit side body 3, and the connecting portion 100 in the cellular telephone 1 will be described.

As shown in FIGS. 1 to 6, the operation unit side body 2 has an outer surface mainly composed of the front case 2a and a rear case 2b. In the operation unit side body 2, the operation key group 11 and a sound input unit 12 as a microphone where the sound of a user of the cellular telephone 1 is inputted during a conversion are disposed on the front case 2a side so as to expose each thereof.

The operation key group 11 is composed of: function setting operation keys 13 for operating various functions such as for various settings, a telephone number directory function, and a mail function; input operation keys 14 such as ten keys for inputting digits of a telephone number and characters for mail; and a selection operation key 15 that performs confirmation of the various operations and scrolls up, down, left and right. Selected features are assigned to each of the keys (key assignment) composing the operation key group 11 according to a transformed state of the operation unit side body 2 and the display unit side body 3, such as the opened or closed state, the front side or back side state and the like, and the type of application that is running. An operation corresponding to a feature assigned to each key is executed by a user pressing one of the keys composing the operation key group 11.

The sound input unit 12 is disposed on an outer end portion side opposite to the connecting portion 100 side (upper end portion side) in a longitudinal direction of the front case 2a. In other words, the sound input unit 12 is disposed on one of the outer end portion sides if the cellular telephone 1 is in the first open state.

On a side face of the operation unit side body 2, an interface which conducts data transmission and reception with external equipment (such as a host apparatus, for example), a headphone/microphone terminal, an interface of a detachable external memory, and a charging terminal for charging a battery are disposed.

As shown in FIGS. 1 to 4 and FIG. 7, the display unit side body 3 has an outer surface thereof mainly composed of the front case 3a and a rear case 3b. On the front case 3a in the display unit side body 3, the display 30 in a predetermined shape for displaying various types of information and a sound output unit 31 as a receiver which outputs sound on the other party side of a conversation are disposed so as to be exposed. The sound output unit 31 is disposed on an outer end portion side opposite to the connecting portion 100 side (lower end portion side) in the longitudinal direction of the display unit side body 3. In other words, the sound output unit 31 is disposed on the other end portion side in the open state of the cellular telephone 1.

In addition, on the rear case 3b of the display unit side body 3, a sub display 32 for displaying various types of information is disposed so as to be exposed. The display 30 and the sub display 32 are composed of a liquid crystal display panel, a drive circuit that drives the liquid crystal panel, and a light source unit such as a backlight that irradiates light from the back surface side of the liquid crystal panel.

As shown in FIGS. 1 to 4 and FIGS. 8 to 9B, the connecting portion 100 is composed of the hinge portion 4 as well as the front cover 160 and the rear cover 170, which cover the hinge portion 4 and can be fitted with each other. The hinge portion 4 has a biaxial hinge mechanism that connects the operation unit side body 2 and the display unit side body 3 so as to be openable and closable at an arbitrary angle about the opening-and-closing axis X and to be rotatable at an arbitrary angle about the pivot axis Y.

Figure 10A:
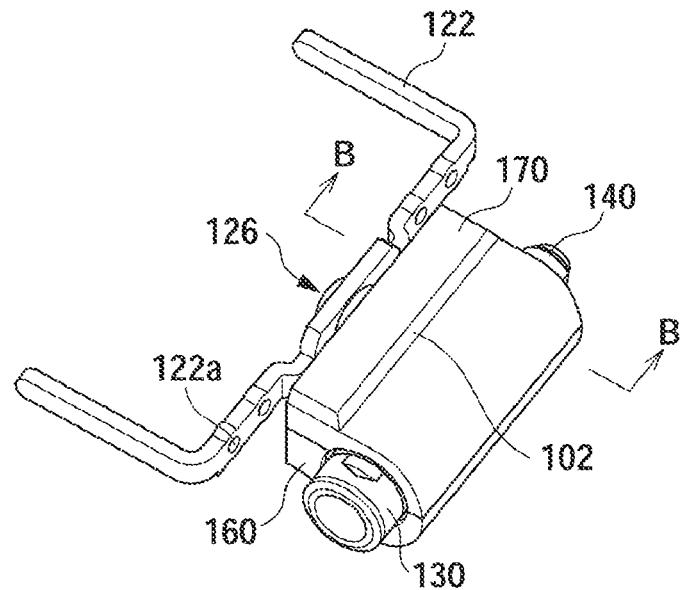
FIG. 10A is a perspective view illustrating a fitted state of the front cover 160 and the rear cover 170.
Figure 10B:
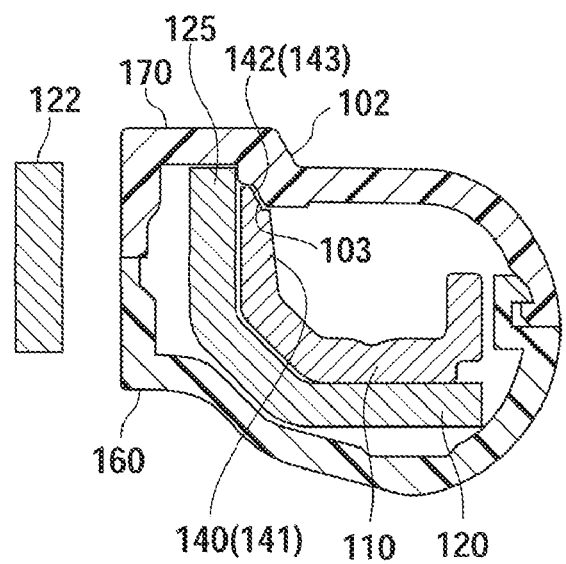
FIG. 10B is an end face view of the line B-B shown in FIG. 10A.
Figure 10C:
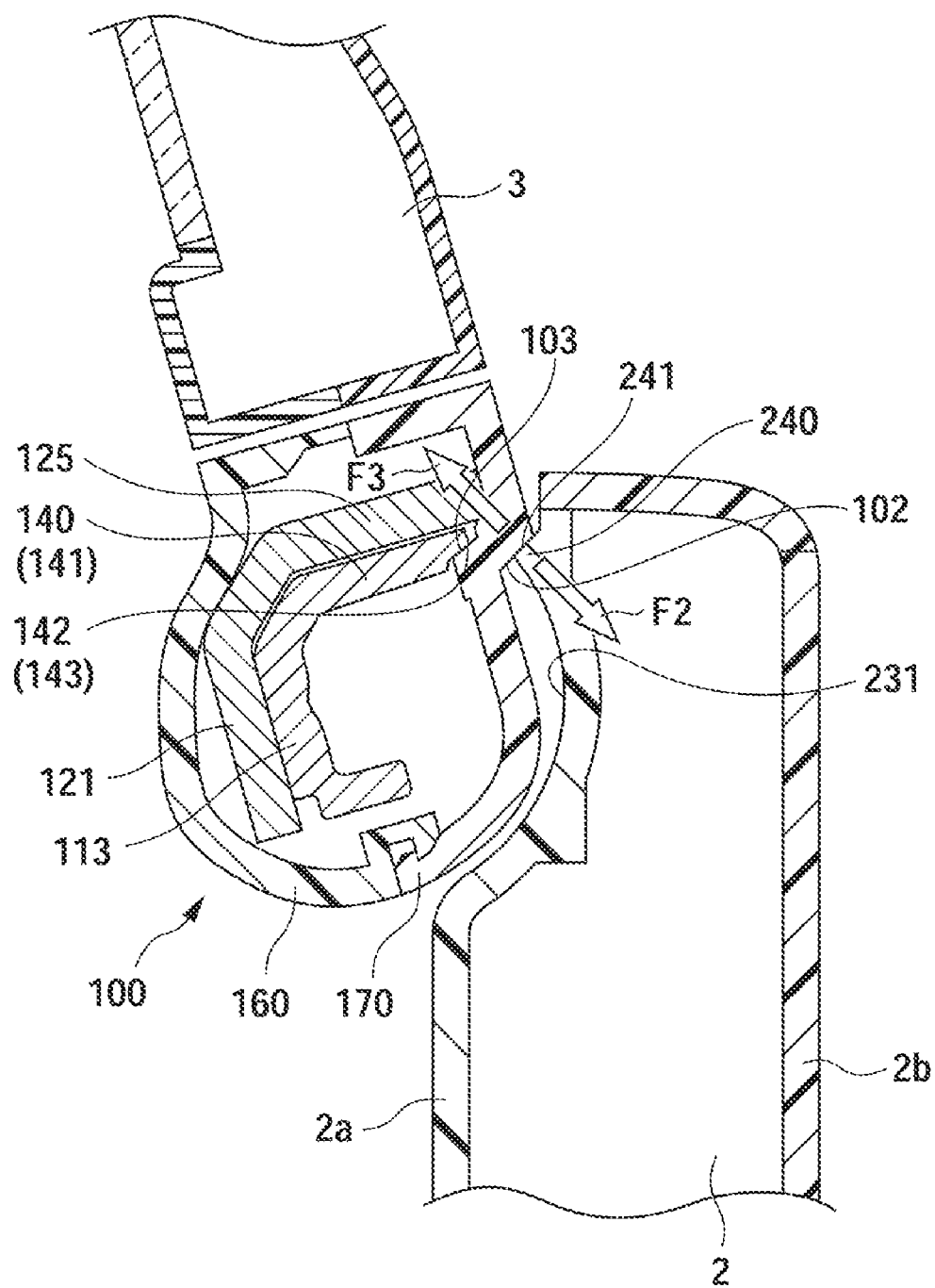
FIG. 10C is a partially enlarged view illustrating a contact state between a first abutment portion 240 and a second abutment portion.

Subsequently, referring to FIGS. 5 to 10C, the internal structures of the operation unit side body 2, the display unit side body 3, and the connecting portion 100 will be described. FIG. 10A is a perspective view illustrating a fitted state of the front cover 160 and the rear cover 170. FIG. 10B is an end face view of the line B-B shown in FIG. 10A. FIG. 10C is a partially enlarged sectional view illustrating a contact state between a first abutment portion 240 and a second abutment portion 101.

The operation unit side body 2 includes, as shown in FIG. 5, the front case 2a, a key seat 40, the above-described operation key group 11, a flexible printed wiring board 50 on which key switches are disposed, a shield case 60, a circuit board 70 provided with various electronic components such as a reference potential pattern layer and an RF (Radio Frequency) module for a cellular telephone, and the rear case 2b. In addition, on the rear case 2b, an antenna 80 is disposed to be extendable to the outside, and a battery 90 is accommodated to be detachable from outside of the rear case 2b. The rear case 2b is closed by a cover portion 25 after the battery 90 is accommodated.

The front case 2a and the rear case 2b are disposed so that the respective concaved-shaped inner faces oppose each other and are connected so that the respective outer peripheral edges are overlapped. In addition, between the front case 2a and the rear case 2b, the key seat 40, the flexible printed wiring board 50, the shield case 60, and the circuit board 70 are contained and disposed in this order from the front case 2a side.

On a first surface 72 in the circuit board 70, various electronic components and the reference potential pattern layer, not shown, are formed. In addition, on a second surface 73 in the circuit board 70, various electronic components are disposed.

The shield case 60 is a metal member having a shape in which one wide surface is opened in a thin rectangular solid. The shield case 60 is not limited to the metal one but may be configured such that a frame is formed by a resin and a metal conductor film is formed on its surface.

The flexible printed wiring board 50 has wiring sandwiched between a plurality of insulating films and has a plurality of key switches 51, 52, and 53 on the surface on the front case 2a side. The key switches 51, 52, and 53 of the flexible printed wiring board 50 have metal domes made of a metal plate curved in a bowl shape and formed three-dimensionally. The metal dome is brought into contact with a switch terminal and electrically conducts when the top of the bowl-shape thereof is pressed. The switch terminal is formed on an electric circuit, not shown, printed on the surface of the flexible printed wiring board 50.

The key seat 40 is configured by attaching the operation key group 11 on the surface of a seat 41 made of silicon rubber by an adhesive. The function setting operation keys 13, the input operation keys 14, and the selection operation key 15 composing the operation key group 11 on the key seat 40 are disposed at positions opposing the key switches 51, 52, and 53 in the flexible printed wiring board 50 and also disposed so as to be exposed from key holes 45 formed in the front case 2a, which will be described later.

The front case 2a has a plurality of the key holes 45 on an inner face opposing the display 30 of the display unit side body 3 in a state in which the cellular telephone 1 is folded. From each of the plurality of key holes 45, pressing surfaces of the function setting operation keys 13, the input operation keys 14, and the selection operation key 15 formed on the key seat 40 are exposed. By pressing down the pressing surfaces of the function setting operation keys 13, the input operation keys 14, and the selection operation key 15 composing the exposed operation key group 11, the top of the metal dome (bowl shape) of each of the corresponding key switches 51, 52, and 53 is pressed, the switch terminal is touched and electrically conducts.

On the upper end portion side of the front case 2a, a first bearing portion 210 and a second bearing portion 220 are formed. The first bearing portion 210 and the second bearing portion 220 protrude from the surface of the front case 2a to the side opposite to the side where the rear case 2b is disposed. The first bearing portion 210 pivotally supports one end 111 of the opening-and-closing axis member 110 composing the connecting portion 100. The second bearing portion 220 pivotally supports an axis member 131 fixed to the other end 112 of the opening-and-closing axis member 110. That is, the first bearing portion 210 and the second bearing portion 220 pivotally support the opening-and-closing axis member 110 rotatably about the opening-and-closing axis X.

As shown in FIG. 5, a fitting portion 230 is formed between the first bearing portion 210 and the second bearing portion 220. In the fitting portion 230, the connecting portion 100 is disposed in a state in which the opening-and-closing axis member 110 is pivotally supported by the first bearing portion 210 and the second bearing portion 220. An interval between an inner wall portion of the first bearing portion 210 and an inner wall portion of the second bearing portion 220 is substantially the same as (slightly wider than) a width of the front cover 160 and the rear cover 170 of the connecting portion 100. As a result, the fitting portion 230 is formed to be capable of fitting the connecting portion 100 therein. On the surface of the front case 2a in the fitting portion 230, a fitting surface 231 is formed.

The fitting surface 231 is formed in the concaved shape so that if the connecting portion 100 is changed from the closed state to the open state by rotation of the opening-and-closing axis member 110, the front cover 160 and the rear cover 170 configuring the outline of the connecting portion 100 are not brought into contact therewith. In other words, the fitting surface 231 is in a curved shape so as to comply with the outlines of the front cover 160 and the rear cover 170 of the connecting portion 100.

In addition, on the fitting surface 231, a first abutment portion 240 that regulates an extension angle of the display unit side body 3 in the open state is formed. The first abutment portion 240 is formed to be capable of abutting a second abutment portion 101 (described later) formed on the rear cover 170 of the connecting portion 100. The first abutment portion 240 regulates the extension angle of the display unit side body 3 by abutting with the second abutment portion 101.

Here, the first abutment portion 240 is formed so as to protrude to the side opposite to the side where the rear case 2b is disposed in the upper end portion side of the front case 2a. In addition, the first abutment portion 240 configures an end portion of the fitting surface 231 and is formed so not to abut the connecting portion 100 in the closed state and in a transition state from the closed state to the open state, but to abut the second abutment portion 101 of the connecting portion 100 only in the open state (see FIG. 10C).

In addition, a first plane 241 extending in a width direction of the front case 2a and formed in a rectangular shape is formed on the first abutment portion 240. The first plane 241 is formed to be capable of abutting a second plane 102 (described later) formed on the second abutment portion 101 in the open state. More specifically, the first plane 241 abuts the second plane 102 in a parallel state in the open state. (see FIG. 10C). In other words, the first plane 241 and the second plane 102 abut in a planar contact state so that they are parallel with each other in the open state.

The display unit side body 3 includes a display window 300, a display unit 310, the front case 3a provided with an internal frame composed of a metal member, a circuit board 320 provided with a reference potential pattern layer and electronic components for display, a sub display unit 330, and the rear case 3b.

The front case 3a and the rear case 3b are disposed so that their respective concaved-shaped inner faces oppose each other and are connected so that their respective outer peripheral edges overlap. In addition, between the front case 3a and the rear case 3b, the circuit board 320 and the sub display unit 330 are contained and disposed in this order from the front case 3a side. The display window 300 and the display unit 310 are fitted in this order on the front face side of the front case 3a.

The display unit 310 is composed of the display 30 and a holder (not shown) fixing the display 30.

The front case 3a is provided inside thereof with a sheet metal member made of metal. The front case 3a also includes shallow concaved-shaped accommodating portions on the front case 3a side and the rear case 3b side, respectively, with the sheet metal member between them. Then, in the accommodating portion on the front case 3a side, the display unit 310 is accommodated and disposed. In the accommodating portion on the rear case 3b side, the circuit board 320 is accommodated and disposed. Here, the sheet metal member functions as a reinforcing member that ensures rigidity against a bending movement or a twisting movement in the display unit side body 3 and also as shielding against static electricity.

In addition, on the lower end portion side of the front case 3a, a connecting hole 34e connected to the connecting portion 100 is disposed.

More specifically, on the lower end portion side of the front case 3a, the connecting hole 34e connected to the rotational axis member 120 of the connecting portion 100 is disposed. The front case 3a and the rotational axis member 120 are connected by way of fixing by threads as follows. First, the connecting hole 34e disposed in the front case 3a is overlapped with a connecting hole 122a disposed in a frame 122 (which will be described later) configuring the rotational axis member 120. In this connecting hole 122a, female threads are formed. A threaded member (not shown) is inserted into the connecting hole 34e and threaded into the connecting hole 122a. As mentioned above, the front case 3a and the rotational axis member 120 are connected.

After the front case 3a and the rotational axis member 120 are connected, the connecting hole 34e is covered and protected by a cover rubber member (not shown).

The circuit board 320 is accommodated and disposed in the accommodating portion on the rear case 3b side in the front case 3a as mentioned above. Various electronic components, not shown, are disposed on the rear case 3b side in the circuit board 320. In addition, the various electronic components form circuit blocks such as a display control block for controlling display modes of the display 30 and the sub display 32, display timing and the like through predetermined combinations.

The sub display unit 330 includes the sub display 32 and the holder (not shown) fixing the sub display 32. The sub display unit 330 is disposed so as to be sandwiched by the rear case 3b and the circuit board 320. In addition, the sub display unit 330 is disposed so as to be exposed from a window portion 3c formed in the rear case 3b.

The connecting portion 100 has, as shown in FIGS. 8 to 10C, the front cover 160, the rear cover 170, and the hinge portion 4 having the biaxial hinge mechanism. The hinge portion 4 is configured by the opening-and-closing axis member 110 composing an opening-and-closing hinge and the rotational axis member 120 composing a rotational hinge fixed (connected) by threads with threaded members S1 and S2. This threading is performed at least at two symmetrical positions about the axial direction of the pivot axis Y. In this embodiment, the fixing by threads is performed with two pairs of screws in total, one of each about the axial direction of the pivot axis Y, inserted in a direction substantially matching the direction in which the first body and the second body are overlapped in the closed state.

The front cover 160 and the rear cover 170 are disposed so that the respective concaved-shaped inner side faces oppose each other and the respective outer peripheral edges overlap, having the hinge portion 4 sandwiched by them. In addition, the width of the front cover 160 and the rear cover 170 (a width in a direction along the opening-and-closing axis X) is slightly smaller than the interval between the inner wall portion of the first bearing portion 210 and the inner wall portion of the second bearing portion 220 in the fitting portion 230. Therefore, the front cover 160 and the rear cover 170 can be fitted in the fitting portion 230.

On the front cover 160, four locking claws 161 are formed protruding to the rear cover 170 side. On the rear cover 170, four locked portions 171 are formed. The four locking claws 161 are formed to be capable of locking the four corresponding locked portions 171. That is, the front cover 160 and the rear cover 170 are engaged by claw latching of the locking claws 161 and the locked portions 171. "Fitting means" in the present invention is configured by the locking claws 161 and the locked portions 171. This fitting means is formed so as to surround an adjusting means, which will be described later.

The rear cover 170 includes the second abutment portion 101 on its surface, locked with the first abutment portion 240 in the open state. In addition, the second abutment portion 101 includes the second plane 102 formed in a planar shape. This second plane 102 abuts the first abutment portion 240. More specifically, the second plane 102 is formed in parallel with the first plane 241 so as to be in planar contact with the first plane 241 formed on the first abutment portion 240 in the open state. That is, the first plane 241 and the second plane 102 abut so that force acting in the open direction can be received in the planar contact state with each other in a case of transition to the open state (See FIG. 10C).

In addition, the second abutment portion 101 of the rear cover 170 includes a fourth plane 103 on a back face thereof. The fourth plane 103 is formed to be in parallel with the second plane 102. That is, the fourth plane 103 is disposed on the side opposite to the second plane 102 in the second abutment portion 101 and at a position corresponding to the second plane 102. Portions where the fourth plane 103 and the second plane 102 are formed have the same plate thickness. As a result, the force from the second plane 102 is uniformly transferred to the fourth plane 103, and third planes 142 and 143 to abut with the fourth plane 103 are made parallel with the second plane 102.

The opening-and-closing axis member 110 is formed in a hollow cylindrical shape. In one end 111 of the opening-and-closing axis member 110, a hollow cylindrical member 130 formed from a material with a low friction coefficient is fitted. A first axis member 131 urging rotation in the opening and closing operation is fixed to the other end 112 of the opening-and-closing axis member 110. The cylindrical member 130 is formed by polyacetal resin (POM), which is a material with a low friction coefficient, for example. In addition, a notch portion 113 with a part of a cylindrical shape cut out is formed substantially at the center part between the one end 111 and the other end 112 in the opening-and-closing axis member 110.

In the notch portion 113, a first connecting hole 151 and a second connecting hole 152 to be threaded with the rotational axis member 120 are disposed at a portion exposed by being cut out. The first connecting hole 151 and the second connecting hole 152 are disposed separately from each other in a direction along the opening-and-closing axis X so as to extend to a direction which is not opened in the notch portion 113. In addition, the first connecting hole 151 and the second connecting hole 152 are disposed at positions corresponding to a first threaded hole 124a and a second threaded hole 124b (which will be described later) formed in the rotational axis member 120.

Then, the threaded members S1 and S2 for fixing by threads are inserted through the first connecting hole 151 and the second connecting hole 152 of the notch portion 113, respectively, and threaded with the first threaded hole 124a and the second threaded hole 124b formed in the rotational axis member 120 located on a side opposite to the notch portion 113, by which the opening-and-closing axis member 110 and the rotational axis member 120 are connected to each other.

The insertion direction of the first threaded hole 124a and the second threaded hole 124b corresponding to each of the first connecting hole 151 and the second connecting hole 152 matches a direction in which the display unit side body 3 and the operation unit side body 2 overlap each other. In addition, the notch portion 113 is formed at a position not closed by the display unit side body 3 and the operation unit side body 2 in the opening-and-closing axis member 110 in a state (closed state) in which the display unit side body 3 and the operation unit side body 2 are closed with respect to the opening-and-closing axis X. Therefore, the threaded members S1 and S2 can be fastened in the closed state and in a state in which the rear cover 170 is removed.

From one end portion (one end portion side in a direction orthogonal to the opening-and-closing axis X of the opening-and-closing axis member 110) of the notch portion 113, a first wall portion 140 and a second wall portion 141 extend to the rear cover 170 side. At the distal ends of the first wall portion 140 and the second wall portion 141, the third planes 142 and 143 are formed substantially in a planar shape. The third planes 142 and 143 are formed so as to be brought into contact with the fourth plane 103 formed on the back face (concaved-shaped inner side face) of the rear cover 170. In addition, the third planes 142 and 143 are formed so as to be parallel with the fourth plane 103 in the open state.

As a result, the first plane 241, the second plane 102, the fourth plane 103, and the third planes 142 and 143 abut so as to be in parallel with each other in the open state. Then, the planar contact between the respective corresponding planes makes absorbing a stress applied on the first abutment portion 240 and the second abutment portion 101 possible in a distributed state.

At the other end portion (the other end portion side in a direction orthogonal to the opening-and-closing axis X of the opening-and-closing axis member 110) of the notch portion 113, a first adjustment concaved portion 114 and a second adjustment concaved portion 115 are formed. The first adjustment concaved portion 114 and the second adjustment concaved portion 115 compose the adjusting means for adjusting a positional relationship between the operation unit side body 2 and the display unit side body 3 by changing a fastening degree of the threaded members S1 and S2 in the fixing by threads of the opening-and-closing axis member 110 and the rotational axis member 120. The adjusting means will be described later.

The rotational axis member 120 includes a connecting plate 121 formed substantially in an L-shape and connected to the opening-and-closing axis member 110, the frame 122 formed substantially in the U-shape and connected to the display unit side body 3, and a second axis member 123 which rotatably connects the frame 122 to the connecting plate 121.

The connecting plate 121 includes a first connecting plate 124 joined to the opening-and-closing axis member 110 and a second connecting plate 125 disposed in a direction orthogonal to the first connecting plate 124 and continuing to the second axis member 123. In the first connecting plate 124, a first threaded hole 124a and a second threaded hole 124b formed so as to overlap the first connecting hole 151 and the second connecting hole 152 of the opening-and-closing axis member 110 are disposed. By threading the threaded members S1 and S2 into the first threaded hole 124a and the second threaded hole 124b while the threaded members S1 and S2 are inserted through the first connecting hole 151 and the second connecting hole 152, respectively, the opening-and-closing axis member 110 and the rotational axis member 120 are connected.

In addition, on the end portion side (end portion side in a direction orthogonal to the opening-and-closing axis X of the opening-and-closing axis member 110) of the first connecting plate 124, a first adjustment projection portion 127 and a second adjustment projection portion 128 are formed. The first adjustment projection portion 127 and the second adjustment projection portion 128 configure the adjusting means for adjusting the positional relationship between the opening-and-closing axis member 110 and the rotational axis member 120 by changing the fastening degree of the threaded members S1 and S2 in the fixing by threads of the opening-and-closing axis member 110 and the rotational axis member 120.

The first adjustment projection portion 127 and the second adjustment projection portion 128 protrude to the rotational axis member 120 side and are formed so as to abut the first adjustment concaved portion 114 and the second adjustment concaved portion 115 when the opening-and-closing axis member 110 and the rotational axis member 120 are fixed by threads.

Figure 12:
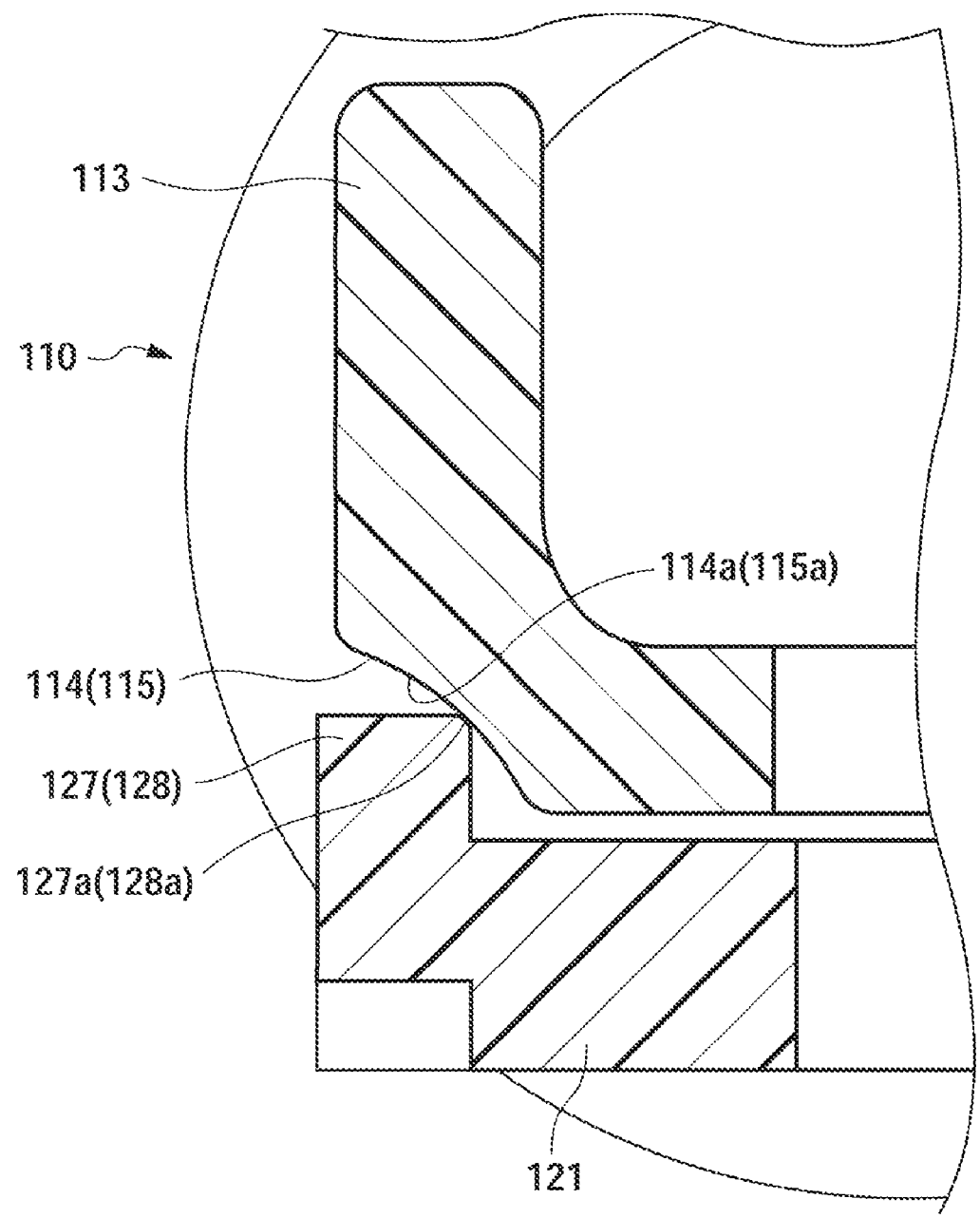
FIG. 12 is a partially enlarged sectional view of an abutting portion between a first (second) adjustment projection portion 127 (128) and a first (second) adjustment concaved portion 114 (115)
Figure 13A:
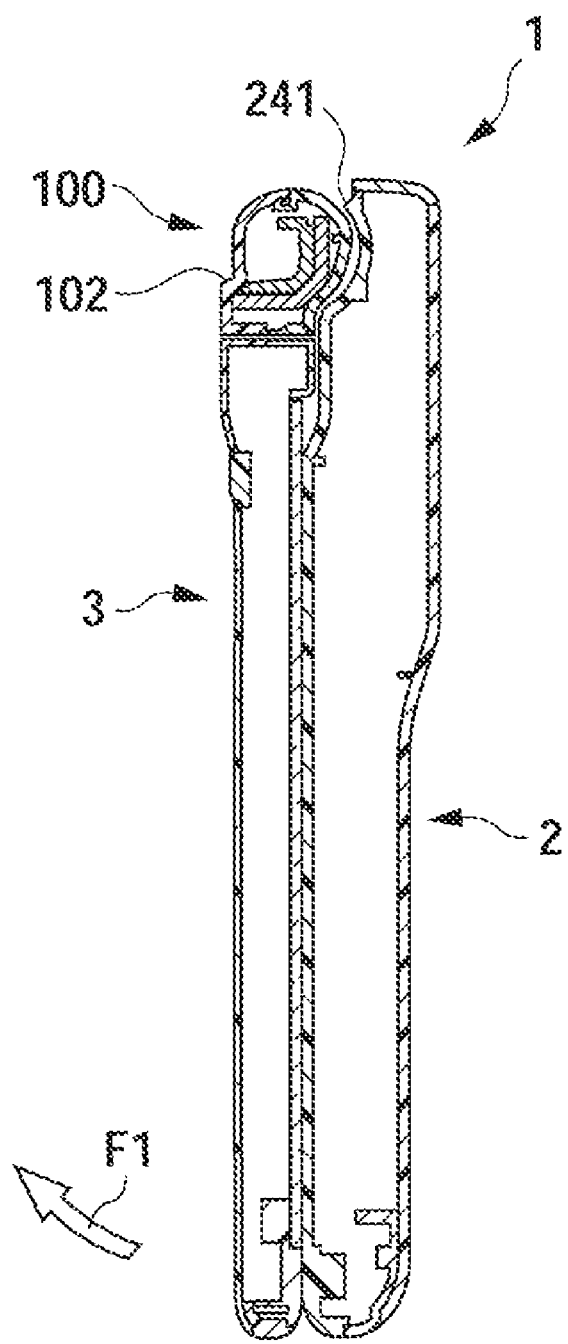
FIG. 13A is a sectional view in a closed state of the cellular telephone 1 with the internal structure omitted.
Figure 13B:
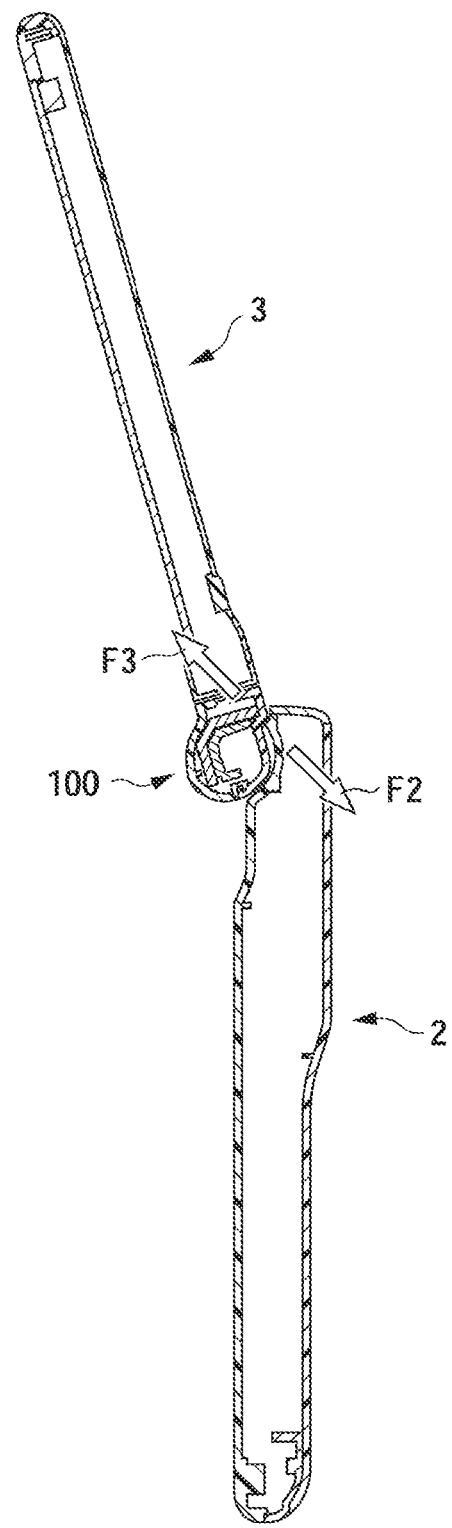
FIG. 13B illustrates a sectional view in an open state of the cellular telephone 1 in FIG. 13A.

The first adjustment concaved portion 114 and the second adjustment concaved portion 115 are formed to be capable of abutting the first adjustment projection portion 127 and the second adjustment projection portion 128 (see FIG. 12). They are formed so as to be concaved in the same direction as a direction (direction from the rotational axis member 120 side to the opening-and-closing axis member 110) in which the first adjustment projection portion 127 and the second adjustment projection portion 128 protrude. More specifically, as shown in FIGS. 13A and 13B, the first adjustment concaved portion 114 and the second adjustment concaved portion 115 formed in a notch portion 113 have inclined faces 114a and 115a, respectively. End portions 127a and 128b of each of the first adjustment projection portion 127 and the second adjustment projection portion 128 abut the inclined faces 114a and 115a, respectively.

The frame 122 is joined to a part of an outer peripheral face on the lower end portion side of the display unit side body 3 and rotatably connected to the second axis member 123. In a connection portion between the frame 122 and the second axis member 123, a hole portion 126 is disposed. By rotatably fitting the second axis member 123 into the hole portion 126, the frame 122 and the second axis member 123 are connected.

The second axis member 123 is formed in a hollow shape and makes the operation unit side body 2 and the display unit side body 3 communicate with each other through the hole portion 126 of the frame 122 and a hole portion of the connecting plate 121. As a result, a cable that electrically connects the circuit board 70 disposed on the operation unit side body 2 and the circuit board 320 disposed on the display unit side body 3 can be inserted through the second axis member 123.

Figure 11A:
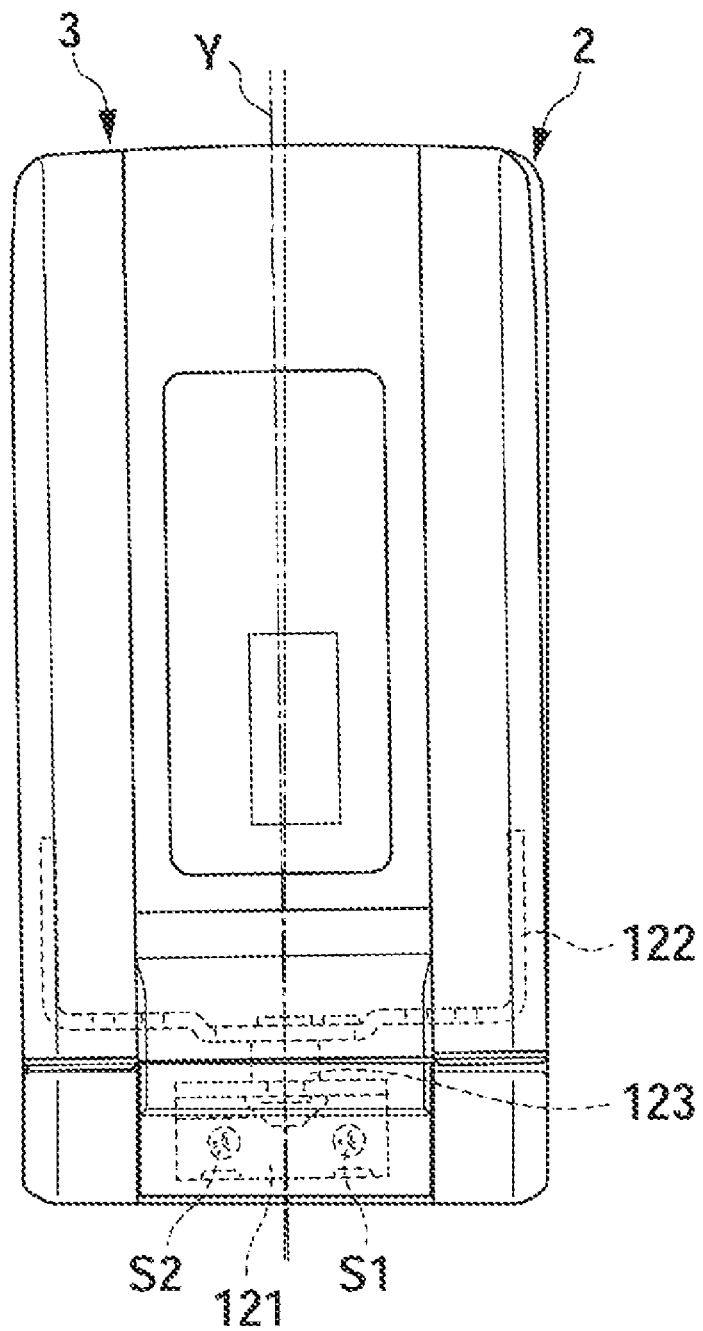
FIG. 11A is a view illustrating a state of positional misalignment between a tip portion of the operation unit side body 2 and a tip portion of the display unit side body 3.
Figure 11B:
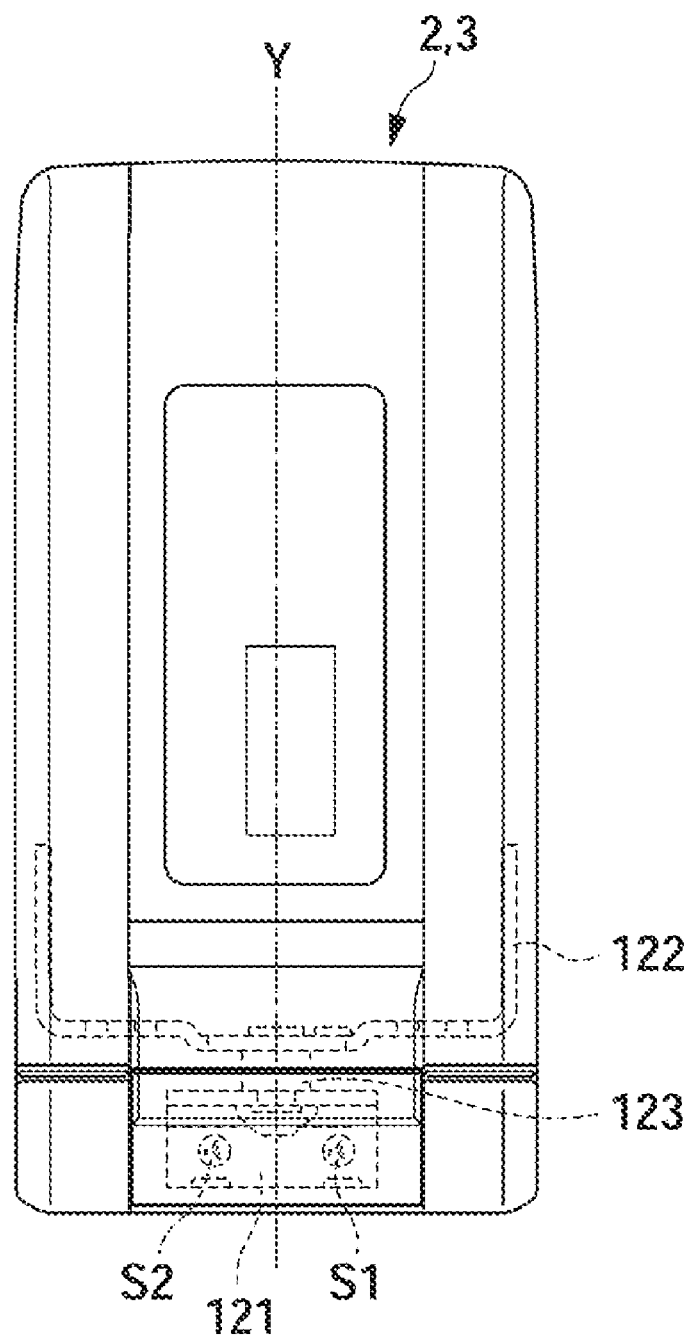
FIG. 11B is a view illustrating a state without positional misalignment between a tip portion of the operation unit side body 2 and a tip portion of the display unit side body 3.

Here, the adjusting means for adjusting the positional misalignment of the display unit side body 3 and the operation unit side body 2 will be explained referring to FIGS. 11A, 11B and 12. FIG. 11A is a view illustrating a state of positional misalignment between a tip portion of the operation unit side body 2 and a tip portion of the display unit side body 3. FIG. 11B is a view illustrating a state without positional misalignment between the tip portion of the operation unit side body 2 and the tip portion of the display unit side body 3. FIG. 12 is a partially enlarged sectional view of an abutting portion of the first adjustment projection portion 127 (the second adjustment projection portion 128) and the first adjustment concaved portion 114 (the second adjustment concaved portion 115).

If the cellular telephone 1 of this embodiment is assembled to a state in which the display unit side body 3 and the operation unit side body 2 are connected by the connecting portion 100 (however, in the connecting portion 100, the front cover 160 is attached but the rear cover 170 is not attached), as shown in FIG. 11B, if there is no positional misalignment between the tip portion of the display unit side body 3 and the tip portion of the operation unit side body 2, the cellular telephone 1 can be completed by attaching the rear cover 170. Since the front cover 160 and the rear cover 170 are joined by latching, they can be attached after the adjustment of the positional alignment.

However, as shown in FIG. 11A, if there is positional misalignment between the tip portion of the display unit side body 3 and the tip portion of the operation unit side body 2, the positional relationship between the opening-and-closing axis member 110 and the rotational axis member 120 needs to be corrected and the positional misalignment between the tip portion of the display unit side body 3 and the tip portion of the operation unit side body 2 needs to corrected by changing the degree of fastening of the screw in the fixing by threads of the threaded member S1 (S2) and the first threaded hole 124a (second threaded hole 124b).

Here, the adjusting means for adjusting the positional relationship between the opening-and-closing axis member 110 and the rotational axis member 120 by changing the degree of fastening of the screw in fixing by threads is formed on both the abutting portion with the notch portion 113 in the opening-and-closing axis member 110 and the abutting portion with the first connecting plate 124 in the rotational axis member 120. Mores specifically, on the other end of the notch portion 113, the first adjustment projection portion 127 and the second adjustment projection portion 128 protruding to the first connecting plate 124 side are disposed, and on the first connecting plate 124, the first adjustment concaved portion 114 and the second adjustment concaved portion 115 concaved to the side opposite to the notch direction of the notch portion 113 are disposed.

The first adjustment concaved portion 114 and the second adjustment concaved portion 115 have a concaved shape corresponding to the shape of the projection direction of the first adjustment projection portion 127 and the second adjustment projection portion 128. Therefore, in a state in which the opening-and-closing axis member 110 and the connecting plate 121 are fastened by way of fixing by threads, the first adjustment projection portion 127 and the second adjustment projection portion 128 abut the first adjustment concaved portion 114 and the second adjustment concaved portion 115, respectively. More specifically, as shown in FIG. 12, the first adjustment concaved portion 114 and the second adjustment concaved portion 115 formed on the first adjustment projection portion 127 and second adjustment projection portion 128 sides of the notch portion 113 have the inclined faces 114a and 115a, respectively. In addition, the end portions 127a and 128a of each of the first adjustment projection portion 127 and the second adjustment projection portion 128 are abutting on the inclined faces 114a and 115a, respectively.

For example, as shown in FIG. 11A, for a state in which the tip portion (end portion on the side opposite to the hinge portion 4) of the display unit side body 3 is disposed on the upper front side with respect to the cellular telephone 1 in the first closed state and a base end portion (end portion on the hinge portion 4 side) of the display unit side body 3 is disposed on the lower front side, the tip portion of the display unit side body 3 is misaligned (inclined) to the left side, for example.

In such a state, the degree of fastening of the threaded member S1 on the right side (the side opposite to the side to which the tip portion of the display unit side body 3 is inclined) is increased. As a result, force is applied in a direction in which the first adjustment projection portion 127 is brought close to the first adjustment concaved portion 114 side and the first adjustment projection portion 127 and the first adjustment concaved portion 114 are displaced from each other. For example, force is applied to the direction in which the end portion 127a climbs the inclined face 114a.

Here, the rotational axis member 120 is connected to the operation unit side body 2 and almost does not move with respect to the operation unit side body 2, and thus, the connecting plate 121 is relatively moved with respect to the operation unit side body 2. As a result, the rotational axis member 120 is brought close to the lower front side (the connecting portion 100 side) in FIG. 11. Moreover, since the threaded member S2 on the left side is fixed, the rotational axis member 120 is rotated clockwise around the vicinity of the threaded member S2 on the left side, and the display unit side body 3 fixed to the opening-and-closing axis member 110 and the frame 122 of the rotational axis member 120 is also rotated clockwise.

As a result, the tip portion of the display unit side body 3 is moved in a direction to reduce the positional misalignment. Therefore, by setting the degree of fastening of the threaded member as appropriate, the positional misalignment between the tip portion of the display unit side body 3 and the tip portion of the operation unit side body 2 can be corrected.

In order to move the tip portion of the display unit side body 3 to the direction opposite to that in the above example, it is only necessary to further fasten the threaded member S2 on the side (left side) opposite to that of the above example. Depending on the case, the positional misalignment may be corrected by fastening both of the threaded members S1 and S2. Alternatively, the positional misalignment can be corrected by loosening the threaded members S1 and S2.

Next, an opening-and-closing operation of the cellular telephone 1 will be described referring to FIGS. 13A and 13B. FIG. 13A is a sectional view of the cellular telephone 1 in the closed state with the internal structure omitted. FIG. 13B is a sectional view of the cellular telephone 1 in the open state.

The cellular telephone 1 is transformed from the closed state to the open state by moving the end portion on the side opposite to the connecting portion 100 in the display unit side body 3 about the opening-and-closing axis X so as to be separated from the operation unit side body 2. That is, by applying force in the arrow F1 direction on the end portion on the side opposite to the connecting portion 100 in the display unit side body 3, the cellular telephone 1 is transformed from the closed state to the open state.

The display unit side body 3 having a force applied thereto in the arrow F1 direction on the end portion transitions from the closed state to the open state; however, when the second abutment portion 101 formed on the connecting portion 100 abuts the first abutment portion 240 formed on the fitting portion 230 at a predetermined extension angle, the second abutment portion 101 and the first abutment portion 240 are locked, and further extension of the display unit side body 3 is regulated.

The cellular telephone 1 enters the open state due to extension of the display unit side body 3 being regulated. Here, the force applied to the display unit side body 3 causes a stress in the connecting portion 100, which regulates the extension of the display unit side body 3. More specifically, stresses in the arrow F2 and F3 directions (See FIG. 10C) are generated in the first abutment portion 240 and the second abutment portion 101, which regulate the extension of the display unit side body 3.

Here, the stress generated on the first abutment portion 240 side is first transferred to the front case 2a of the operation unit side body 2. The front case 2a hereby has a predetermined strength and can absorb the stress.

However, the stress generated in the second abutment portion 101 is transferred to the rear cover 170 of the connecting portion 100. Since the rear cover 170 is formed to be thin in order to reduce the size, there is a fear of the cover not withstanding the stress and being broken. On the other hand, the second abutment portion 101 is disposed on the surface of the rear cover 170 and is in contact with a part of the hinge portion 4, which is firmly fixed. That is, a wall to receive the stress is made on the back face of the rear cover 170. As a result, the hinge portion 4 can receive the stress.

More specifically, the second abutment portion 101 abuts the first wall portion 140 and the second wall portion 141 of the opening-and-closing axis member 110 composing the hinge portion 4 and also abuts the tip end of the second connecting plate 125 of the rotational axis member 120. Therefore, the stress generated in the second abutment portion 101 can be first received by the rear cover 170, and then by the first wall portion 140 and the second wall portion 141 of the opening-and-closing axis member 110 abutting the back face of the rear cover 170 as well as the second connecting plate 125.

In addition, the opening-and-closing axis member 110 provided with the first wall portion 140 and the second wall portion 141 is connected to the rotational axis member 120 through the threaded members S1 and S2. Therefore, a part of the stress can be made to dissipate in the connection portion between the opening-and-closing axis member 110 and the rotational axis member 120. Moreover, since the rotational axis member 120 is connected to the display unit side body 3 through the threaded member, the stress can be also made to dissipate therein. As a result, the stress can be distributed and absorbed without breaking the rear cover 170. Moreover, since the second abutment portion 101 also abuts the second connecting plate 125, the stress can also be distributed to the opening-and-closing axis member 110 side and the rotational axis member 120 side with better balance.

In addition, the second plane 102 is formed so as to be parallel with the third planes 142 and 143 abutting the fourth plane 103 on the back face side formed in parallel with the second plane 102. That is, the third planes 142 and 143 are disposed in a state parallel with the second plane 102 through the rear cover 170. As mentioned above, the planar contact between the hinge portion 4 and the second abutment portion 101 enlarges a contact area and can prevent the stress concentration, and more stress can be transferred to the hinge portion 4 side in the distributed state.

In addition, the opening-and-closing axis member 110 and the rotational axis member 120 are configured to be connected by way of fixing by threads, and the second abutment portion 101 and the hinge portion 4 abut each other in the parallel state. As a result, even in the case of transitioning to the open state, the stress generated in the connecting portion 100 can be efficiently absorbed. Therefore, the size and thickness of the connecting portion 100 as well as of the entire cellular telephone 1 can be reduced while the strength of the hinge portion 4 can be sufficiently ensured.

In addition, at the abutting portion between the opening-and-closing axis member 110 and the rotational axis member 120, the first adjustment projection portion 127 and the second adjustment projection portion 128 as well as the first adjustment concaved portion 114 and the second adjustment concaved portion 115, which are the adjusting means, are formed. As a result, with the above-mentioned procedure, the positional relationship between the display unit side body 3 fixed to the rotational axis member 120 and the operation unit side body 2 fixed to the opening-and-closing axis member 110 can be adjusted, and thus, the positional misalignment between the tip portions of both of the bodies 3 and 2 can be easily adjusted.

In addition, the opening-and-closing axis member 110 and the rotational axis member 120 are connected by way of fixing by threads at the two symmetrical positions with respect to the axial direction of the pivot axis Y. Therefore, by fastening either one of the threaded member S1 and the threaded member S2, the angle of the display unit side body 3 with respect to the operation unit side body 2 can be easily adjusted with similar operability.

In addition, the notch portion 113 is formed at a position not to be obstructed by the display unit side body 3 and the operation unit side body 2 in the state in which the display unit side body 3 and the operation unit side body 2 are closed about the opening-and-closing axis X. Moreover, the insertion direction of the threaded member S1 into the first threaded hole 124a matches the direction in which the display unit side body 3 and the operation unit side body 2 overlap each other. Thus, in the state in which the display unit side body 3 and the operation unit side body 2 are closed about the opening-and-closing axis X, the threaded member S1 can be easily fastened.

In addition, since the opening-and-closing axis member 110 and the rotational axis member 120 are configured to be connected by way of fixing by threads, the strength of the hinge portion 4 can be sufficiently ensured while the size and thickness of the entire cellular telephone 1 are reduced.

Furthermore, since the opening-and-closing axis member 110 and the rotational axis member 120 can be manufactured separately, restrictions on the shapes in manufacture are few and an order can be placed from separate manufacturers suitable for the respective manufacture, which can reduce component costs and moreover, facilitate earlier delivery. It should be noted that, although the third planes 142 and 143 are formed on the opening-and-closing axis member 110 in this embodiment, it is not limited thereto, and may be formed at the tip end of the second connecting plate 125 of the rotational axis member 120. Even in a case of the third planes 142 and 143 being formed at the tip end of the second connecting plate 125, similar effects can be obtained. In addition, the third planes 142 and 143 are preferably formed on both of the tip ends of the opening-and-closing axis member 110 and the second connecting plate 125.

Next, a configuration of the adjusting means of the hinge portion in the cellular telephone 1 in the embodiment of the present invention will be explained in detail referring to the drawings. In the explanation of the adjusting means below, the above description and drawings are used due to having the same configuration as that in the above-mentioned embodiment. For aspects not particularly explained, the explanation for the above embodiment is applied as appropriate.

Below, the detailed configuration particularly of the hinge portion 4 of the cellular telephone 1 will be described below in detail referring to FIGS. 7 and 13A to 21B.

Figure 14A:
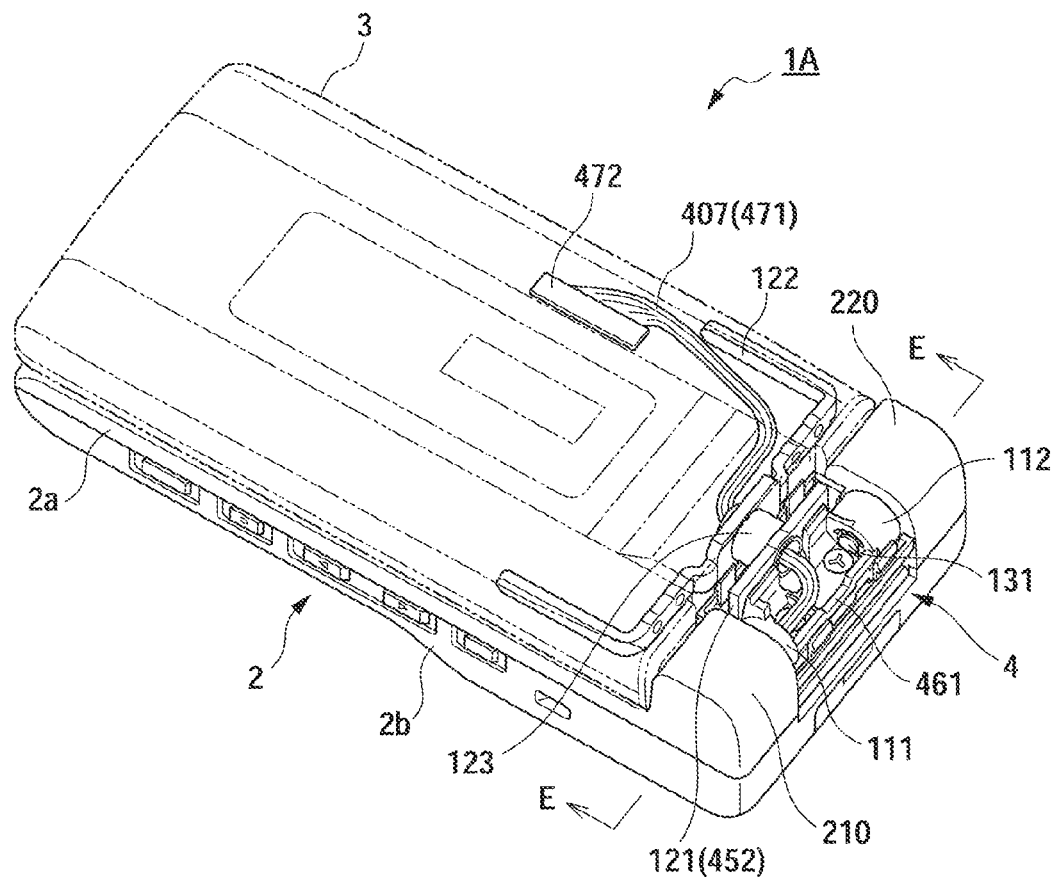
FIG. 14A is a perspective view virtually illustrating the display unit side body 3, the rear cover 170 and the like in a see-through manner in the cellular telephone 1 of the embodiment in the first closed state.
Figure 14B:
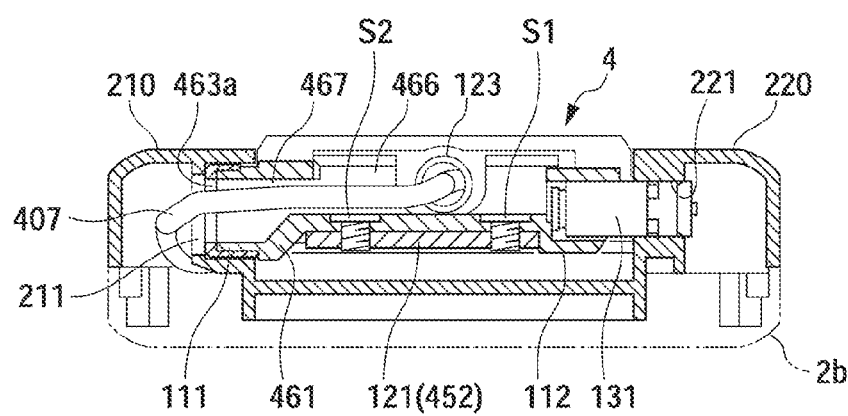
FIG. 14B is a sectional view of the line E-E shown in FIG. 14A.
Figure 15:
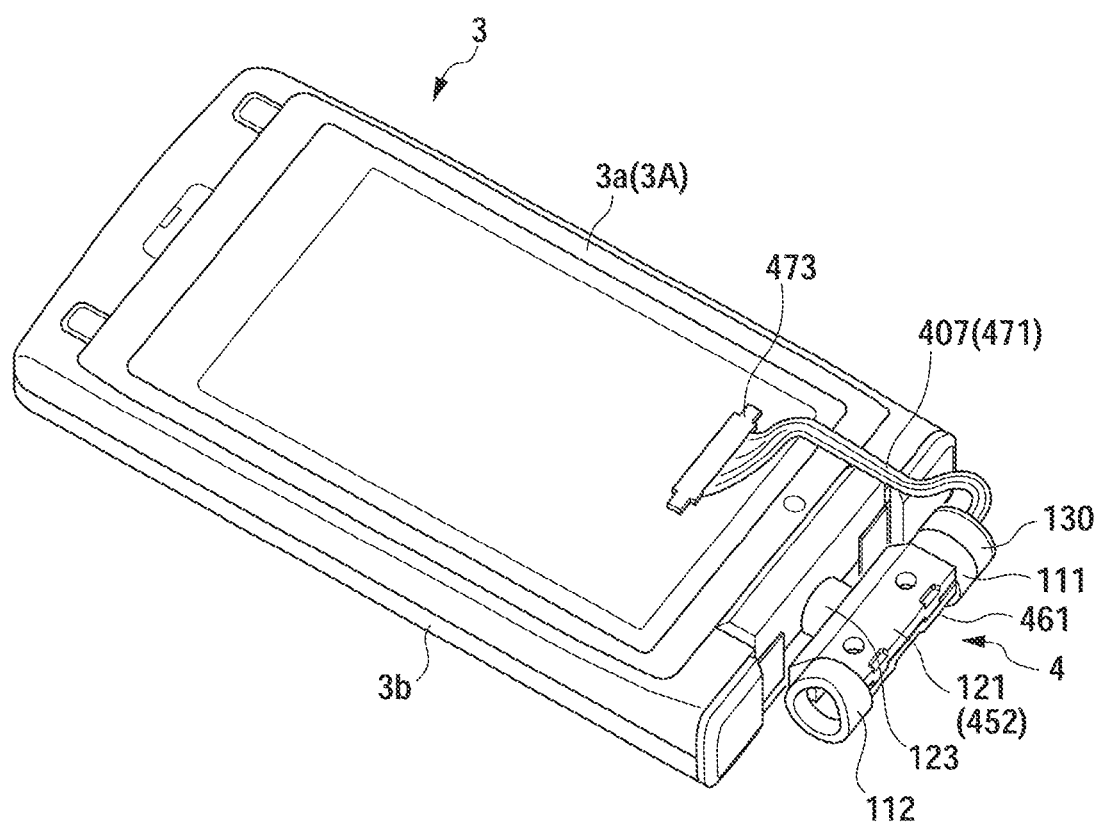
FIG. 15 is a perspective view of the display unit side body 3 and the hinge portion 4 seen from a front face 3A side of the display unit side body 3.

FIG. 14A is a perspective view virtually illustrating the display unit side body 3, the rear cover 170 and the like in a see-through manner in the cellular telephone 1 in the first closed state. FIG. 14B is a sectional view of the line E-E shown in FIG. 14A. FIG. 15 is a perspective view of the display unit side body 3 and the hinge portion 4 seen from a front face 3A side of the display unit side body 3.

Figure 16:
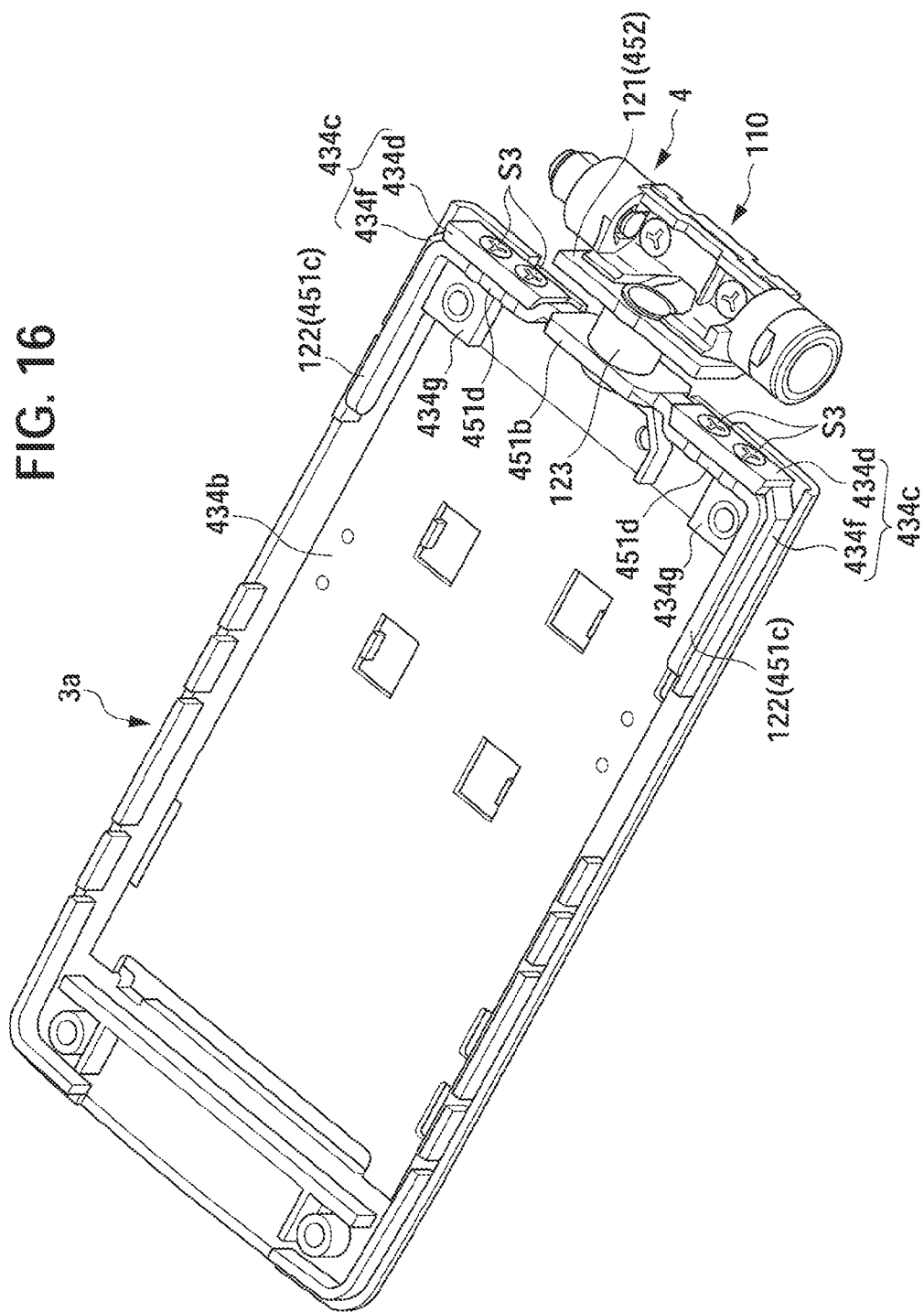
FIG. 16 is a perspective view of a part of the display unit side body 3 and the hinge portion 4 seen from the back face 3B side of the display unit side body 3.
Figure 17:
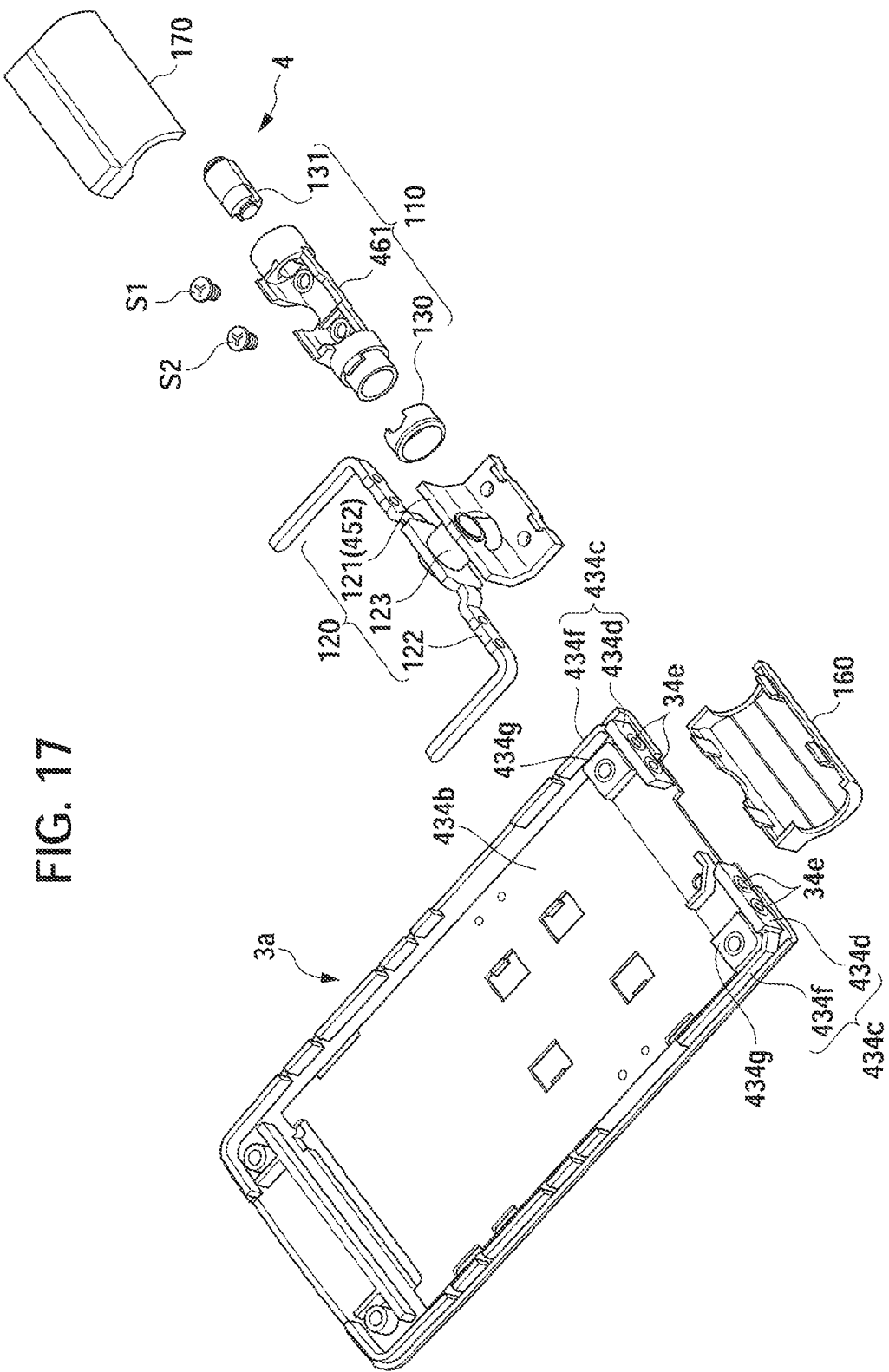
FIG. 17 is an exploded perspective view of a part of the display unit side body 3 and the hinge portion 4 seen from the back face 3B side of the display unit side body 3.
Figure 18A:
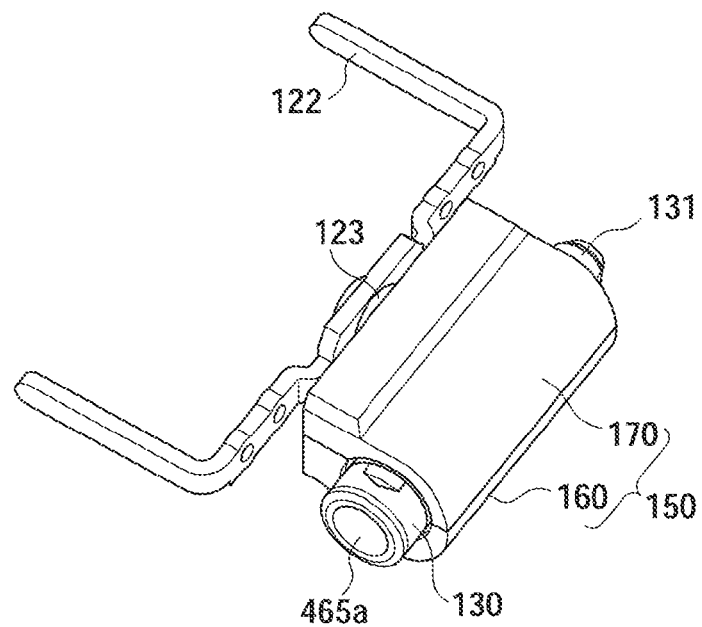
FIG. 18A is a perspective view illustrating the hinge portion 4.
Figure 18B:
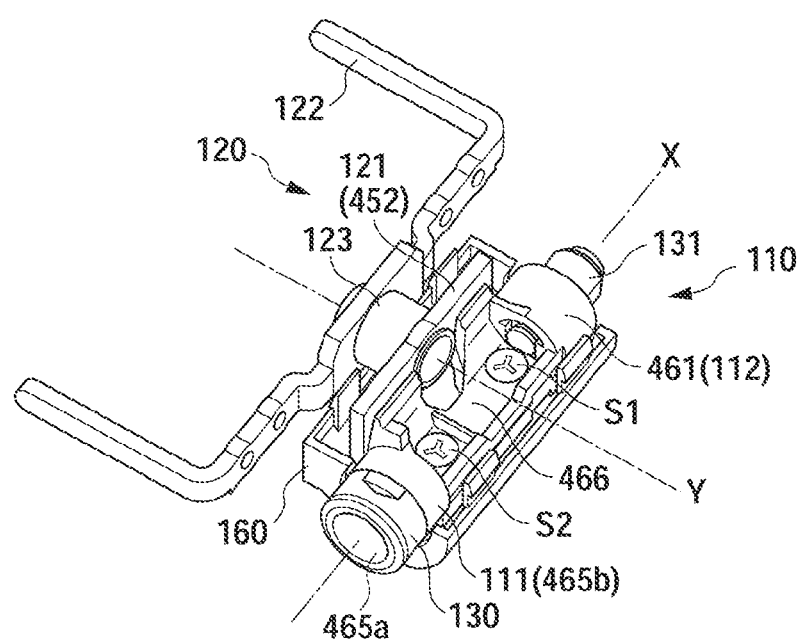
FIG. 18B is a perspective view illustrating the hinge portion 4.
Figure 19A:
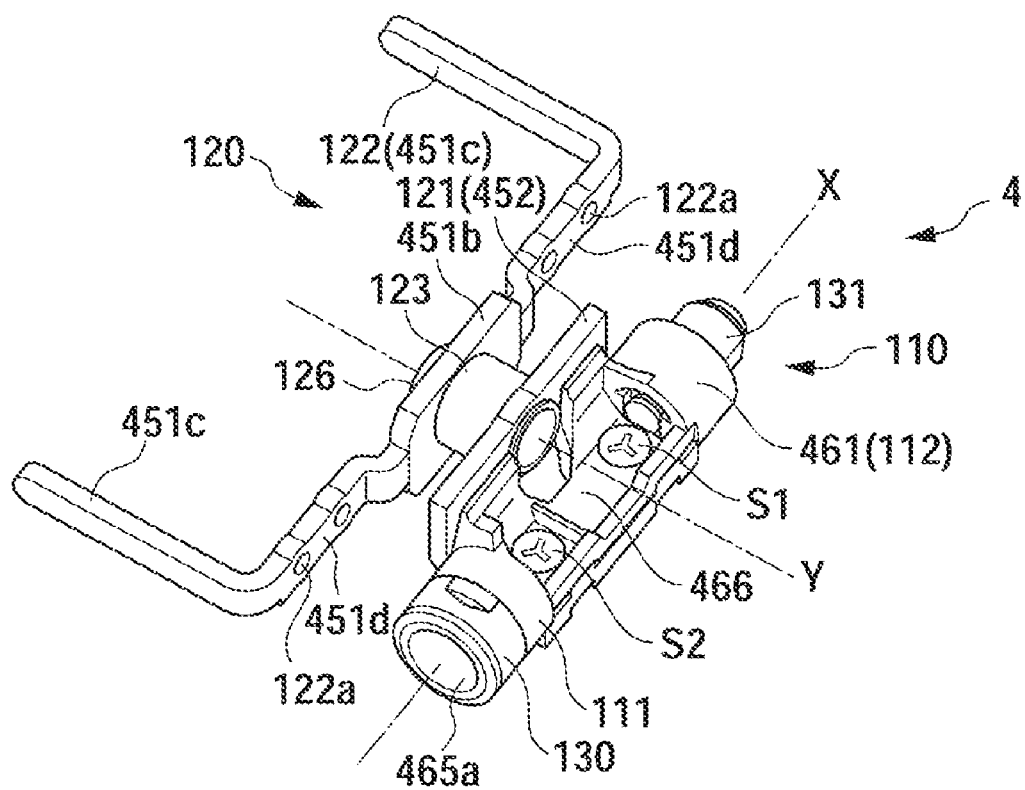
FIG. 19A is a perspective view illustrating the hinge portion 4.
Figure 19B:
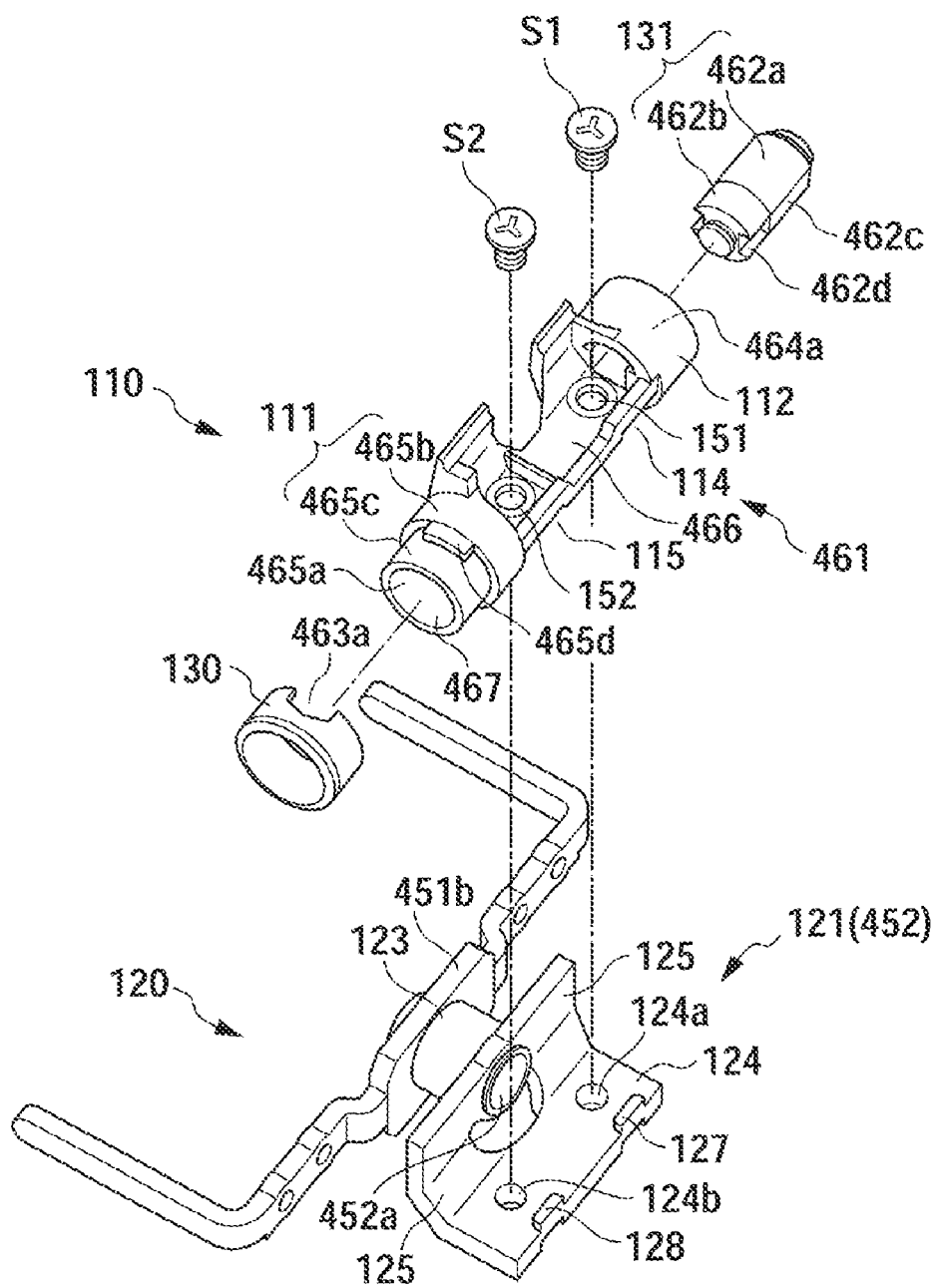
FIG. 19B is an exploded perspective view illustrating the hinge portion 4.
Figure 20A:
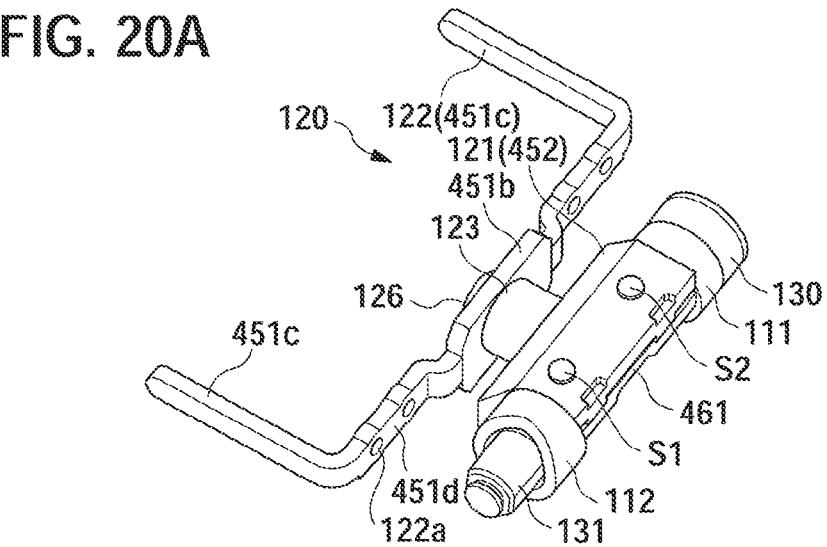
FIG. 20A is a perspective view (view seen from the side opposite to the direction shown in FIG. 19A) illustrating the hinge portion 4.
Figure 20B:
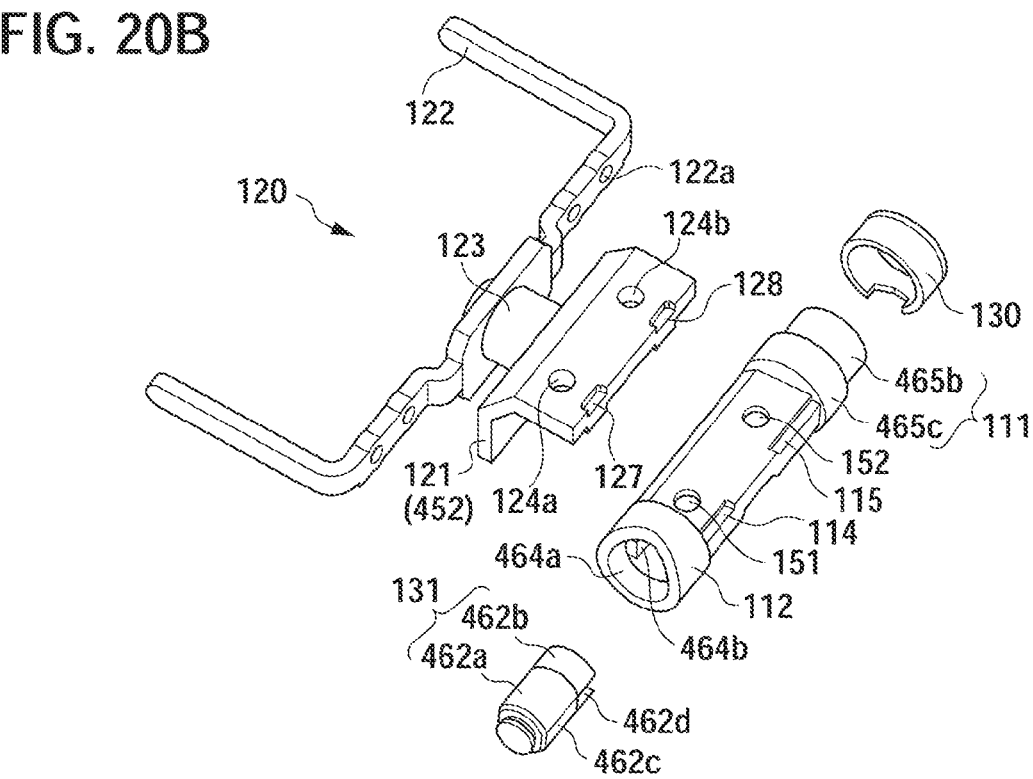
FIG. 20B is an exploded perspective view illustrating the hinge portion 4.

FIG. 16 is a perspective view of a part of the display unit side body 3 and the hinge portion 4 seen from a back face 3B side of the display unit side body 3. FIG. 17 is an exploded perspective view of a part of the display unit side body 3 and the hinge portion 4 seen from the back face 3B side of the display unit side body 3. FIGS. 18A and 18B are perspective views illustrating the hinge portion 4. FIG. 19A is a perspective view illustrating the hinge portion 4. FIG. 19B is an exploded perspective view illustrating the hinge portion 4. FIG. 20A is a perspective view (view seen from the side opposite to the direction shown in FIG. 19A) illustrating the hinge portion 4. FIG. 20B is an exploded perspective view illustrating the hinge portion 4.

Figure 21A:
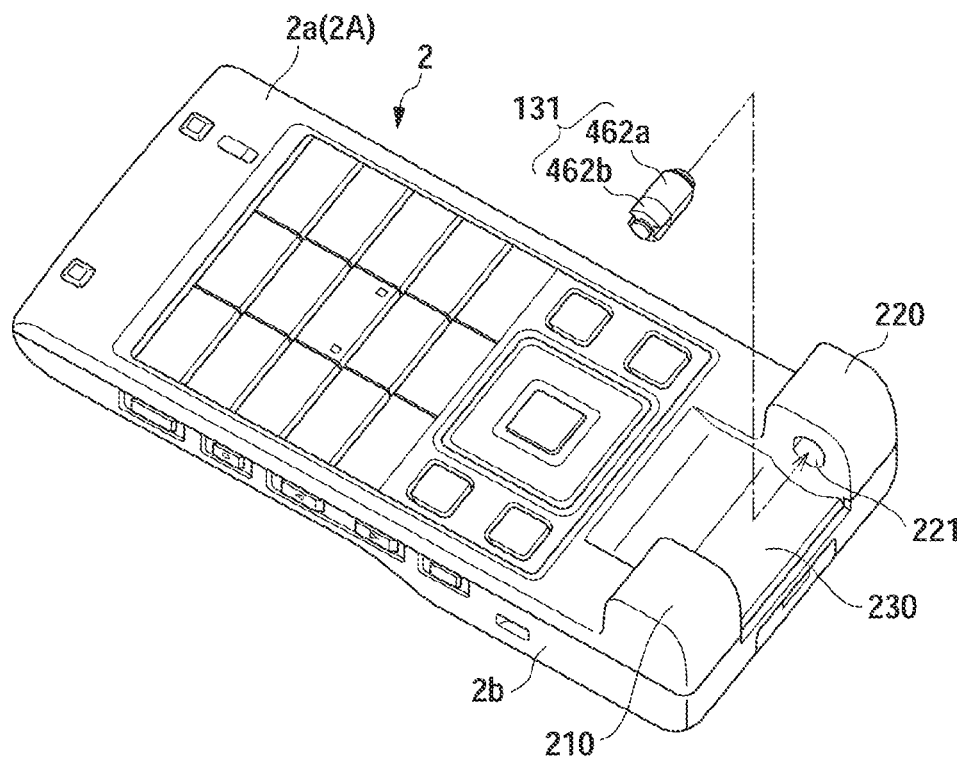
FIG. 21A is an exploded perspective view illustrating the operation unit side body 2 and a first axis member 131 of the hinge portion 4.
Figure 21B:
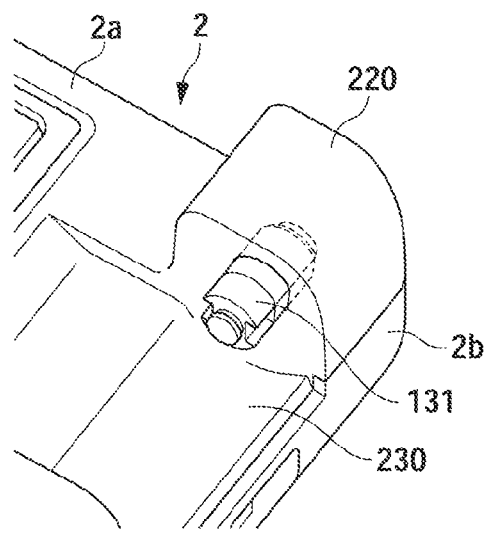
FIG. 21B is a partially enlarged perspective view illustrating a state in which the first axis member 131 is attached to the operation unit side body 2.

FIG. 21A is an exploded perspective view illustrating the operation unit side body 2 and the first axis member 131 of the hinge portion 4. FIG. 21B is a partially enlarged perspective view illustrating a state in which the first axis member 131 is attached to the operation unit side body 2.

The cellular telephone 1 of the embodiment further includes a cable 407 that electrically connects electronic components (not shown) in the display unit side body 3 and electronic components (not shown) in the operation unit side body 2 as shown in FIGS. 14A to 15. The cable 407 includes a wiring portion 471, a first connector 472 connected to the end portion on the display unit side body 3 side in the wiring portion 471, and a second connector 473 connected to the end portion on the operation unit side body 2 side in the wiring portion 471. The first connector 472 is connected to the electronic components in the display unit side body 2, while the second connector 473 is connected to the electronic components in the operation unit side body 2.

The wiring portion 471 extends into the display unit side body 3 and the operation unit side body 2 through the inside of the hinge portion 4. More specifically, the wiring portion 471 is inserted from the inside of the display unit side body 3 to the inside of the operation unit side body 2 sequentially through the second axis member 123, an open portion 466, a continuous space 467, a second opening 465a, a bearing face 211, and the first bearing portion 210 (the details thereof will be described later) in this order.

A configuration of the display unit side body 3 will be described in detail. As shown in FIGS. 7, 16, and 17, the display unit side body 3 includes the display window 300, the display unit 310, the front case 3a provided with an internal frame made up of a metal member, the circuit board 320 provided with a reference potential pattern layer as a reference potential portion and an electronic component for display, the sub display unit 330, and the rear case 3b.

The front case 3a and the rear case 3b are disposed so that their respective concaved-shaped inner faces oppose each other and are connected with their respective outer peripheral edges overlapped. In addition, between the front case 3a and the rear case 3b, the circuit board 320 and the sub display unit 330 are accommodated and disposed in this order from the front case 3a side.

The display unit 310 is composed of the display 30 and a holder 433a fixing the display 30.

The front case 3a is provided with a sheet metal member made of metal therein. The front case 3a is provided with a shallow concaved-shaped first accommodating portion 434a and second accommodating portion 434b on the display window 300 side and the rear case 3b side with the sheet metal member between them, respectively. The display unit 310 is accommodated and disposed in the first accommodating portion 434a on the display window 300 side. In the second accommodating portion 434b on the rear case 3b side, the circuit board 320 is accommodated and disposed. Here, the sheet metal member also functions as a reinforcing member that ensures rigidity against a bending movement or a twisting movement in the display unit side body 3 and also as shielding against static electricity.

On an inner end portion (end portion on the hinge portion 4 side) and a part of a side edge portion (a neighboring portion of the inner end portion) of the second accommodating portion 434b, a lower wall portion 434d and a side wall portion 434f installed upright toward the rear case 3b are disposed, respectively. The lower wall portion 434d is disposed separately as a pair at locations where a first portion 451b of the frame 122 as a first body fixing component is installed. The lower wall portion 434d and the side wall portion 434f generally form an L-shaped wall portion (hereinafter referred to as an "L-shaped wall portion) 434c. In the pair of the lower wall portions 434d, two connecting holes 34e penetrating therethrough are formed, respectively.

Inside the L-shaped wall portion 434c, a rectangular projection portion 434g is disposed. The rectangular projection portion 434g is separated from the inner wall of the L-shaped wall portion 434c with a space slightly wider than a thickness of the frame 122. Thus, the frame 122 can be installed in a space between the L-shaped wall portion 434c and the rectangular projection portion 434g. In this state, second male threads S3 are fastened to the connecting hole 122a of the frame 122 through the connecting hole 34e (details will be described later). As a result, the frame 122 is connected to the front case 3a (display unit side body 3) without loosening.

The circuit board 320 is accommodated and disposed in the second accommodating portion 434b formed in the front case 3a as mentioned above. On a mounting surface on the rear case 3b side in the circuit board 320, various electronic components, not shown, are disposed. The sound output unit 31 is disposed on the end portion side opposite to the hinge portion 4 in the mounting surface of the circuit board 320. In addition, the various electronic components disposed on the mounting surface of the circuit board 320 form circuit blocks such as a display control block for controlling display modes of the display 30 and the sub display 32 and the timings thereof through predetermined combinations.

The sub display unit 330 includes the sub-display 32 and a holder 433b for fixing the sub-display 32. The sub display unit 330 is disposed so as to be interposed by the rear case 3b and the circuit board 320. That is, the sub display unit 330 presses the circuit board 320 to the front case 3a side by force applied by being sandwiched by the front case 3a and the rear case 3b.

On the base end portion (end portion on the hinge portion 4 side) of the operation unit side body 2, the second bearing portion 220 and the first bearing portion 210 are formed as shown in FIGS. 21A and 21B. The second bearing portion 220 and the first bearing portion 210 protrude toward the surface 2A side of the operation unit side body 2 separately in the width direction of the operation unit side body 2. A space between the inner wall portion of the second bearing portion 220 and the inner wall portion of the first bearing portion 210 is substantially the same as (slightly narrower than) a width of a hinge case 150 (details will be described later). That is, on the base end portion of the operation unit side body 2, the concaved-shaped fitting portion 230 into which the hinge case 150 is fitted and inserted is formed.

On both inner wall portions in the opening-and-closing axis X direction in the fitting portion 230, i.e. on the inner wall portions of the second bearing portion 220 and the first bearing portion 210, a bearing face 221 and the bearing face 211 are disposed, respectively. The first axis member 131 in the opening-and-closing axis member 110 of the hinge portion 4 is inserted and fixed to the bearing face 221 to be incapable of rotation. The one end 111 of the opening-and-closing axis member 110, in a state in which the cylindrical member 130 is inserted externally, is rotatably inserted to the bearing face 211. The details of the opening-and-closing axis member 110 will be described later.

Next, the hinge portion 4 will be described in detail. The hinge portion 4 is configured mainly of the rotational axis member 120 and the opening-and-closing axis member 110 as shown in FIGS. 16 to 21B. The rotational axis member 120 has the frame 122 fixed (connected) to the display unit side body 3 and the connecting plate 121 as a first connecting component 452 connected to the frame 122 to be rotatable about the pivot axis Y. The opening-and-closing axis member 110 has a second connecting component 461 (corresponding to the opening-and-closing axis member 110) connected to the operation unit side body 2 to be rotatable about the opening-and-closing axis X.

The hinge portion 4 is configured by connecting the connecting plate 121 and the second connecting component 461 by way of fixing by threads. This fixing by threads is performed at least at two symmetrical positions about the axial direction of the pivot axis Y. In the present embodiment, the fixing by threads is performed by two pairs of screws (the threaded member S1 and the first threaded hole 124a, and the threaded member S2 and the second threaded hole 124b), one of each about the axial direction of the pivot axis Y.

The rotational axis member 120 is composed mainly of the frame 122, the connecting plate 121, and the second axis member 123. The frame 122 and the connecting plate 121 are connected by the cylindrical second axis member 123 to be capable of relative rotation. That is, the second axis member 123 constitutes a connection portion between the frame 122 and the connecting plate 121. The pivot axis Y is located in the second axis member 123.

The frame 122 is fixed to one end side of the second axis member 123. The connecting plate 121 is disposed to the other end side of the second axis member 123. An insertion hole 452a through which the second axis member 123 can be inserted is formed in the connecting plate 121. The second axis member 123 inserted through the insertion hole 452a is pivotally supported by the connecting plate 121 to be rotatable.

The frame 122 has a substantial U-shape and includes a first portion 451b in which the hole portion 126 is formed and a pair of second portions 451c perpendicular to the first portion 451b. The first portion 451b and the pair of second portions 451c are connected by a pair of third portions 451d, respectively. The first portion 451b and the third portions 451d extend in a direction orthogonal to the pivot axis Y. In each of the pair of third portions 451d, two connecting holes 122a forming a pair with the second male threads S3 (four in total) are formed. The four connecting holes 122a are arranged linearly at positions corresponding to the four connecting holes 34e in the front case 3a. The third portion 451d and the front case 3a are connected by way of fixing by threads between the second male threads S3 and the connecting hole 122a.

The connecting plate 121 has a substantially L-shaped section and includes the second connecting plate 125 in which the insertion hole 452a is formed and the first connecting plate 124 perpendicular to the second connecting plate 125. The second connecting plate 125 and the first connecting plate 124 are connected by a third portion 452d inclined by approximately 45°. The connecting plate 121 extends in a direction parallel to the opening-and-closing axis X.

In the first connecting plate 124, two threaded holes, i.e. the first threaded hole 124a and the second threaded hole 124b forming pairs with the threaded member S1 and the threaded member S2, respectively, are formed separately in a direction along the opening-and-closing axis X. The two threaded holes, i.e. the first threaded hole 124a and the second threaded hole 124b, are disposed at positions corresponding to the two connecting holes, i.e. the first connecting hole 151 and the second connecting hole 152 in the second connecting component 461. The first connecting plate 124 and the second connecting component 461 are connected byway of fixing by threads between the threaded member S1 and the first threaded hole 124a as well as the threaded member S2 and the second threaded hole 124b.

The processing method of the frame 122 and the connecting plate 121 is not particularly limited; however, from the viewpoint of ensuring the strength and ease in the processing thereof, molding by sheet metal working is preferred.

The hinge portion 4 is connected to the base end portion of the display unit side body 3 by the frame 122 on the rotational axis member 120 side. More specifically, the frame 122 of the rotational axis member 120 is connected to the front case 3a. That is, the rotational axis member 120 has a structure which connects the display unit side body 3 and the other end 112 and the one end 111 in the second connecting component 461 to be rotatable about the pivot axis Y.

The opening-and-closing axis member 110 is composed mainly of the second connecting component 461, the first axis member 131, and the cylindrical member 130 and has a columnar shape in an overall view.

The second connecting component 461 has the other end 112 side and the one end 111 side in a cylindrical shape, and a gap between the other end 112 and the one end 111 is the partially opened open portion 466 (notch portion 113). The second connecting component 461 has a first opening 464a penetrating between the other end 112 and the open portion 466 and the second opening 465a penetrating between the one end 111 and the open portion 466.

The first axis member 131 has a substantially columnar shape in an overall view as shown in FIGS. 19B and 20B. The first axis member 131 is composed of a body-side trunk portion 462a and a hinge-side trunk portion 462b pivotally supported and rotatable about the body-side trunk portion 462a.

The body-side trunk portion 462a is a portion inserted into the bearing face 221 of the second bearing portion 220 in the operation unit side body 2 and fixed. An entire length of the first axis member 131 is preferably longer than a depth of the bearing face 221. The bearing face 221 can have the whole of the body-side trunk portion 462a and at least a part of the hinge-side trunk portion 462b inserted into the first axis member 131.

The body-side trunk portion 462a has a noncircular section, or specifically, a substantially drum-shaped section having a planar portion 462c. The substantially drum shape is a shape obtained by removing a pair of arches (a figure surrounded by a chord and an arc) located symmetrically from the circle with respect to its center. The bearing face 221 has a substantially drum-shaped section corresponding to the body-side trunk portion 462a, i.e. a noncircular and substantially drum-shaped section similarly to the sectional shape of the body-side trunk portion 462a. Thus, if the body-side trunk portion 462a is inserted into the bearing face 221, the portion is made unrotatable with respect to the bearing face 221. That is, the bearing face 221 has a shape such that the body-side trunk portion 462a of the first axis member 131 is slidably inserted into the bearing face 221 in the axial direction of the opening-and-closing axis X and rotation of the inserted body-side trunk portion 462a is regulated.

The hinge-side trunk portion 462b is a portion inserted into the first opening 464a of the second connecting component 461 and fixed thereto, and the sectional shape thereof substantially matches the body-side trunk portion 462a.

The first axis member 131 realizes the configuration in which "the hinge-side trunk portion 462b can slide to the body-side trunk portion 462a side, but the body-side trunk portion 462a cannot slide to the hinge-side trunk portion 462b side". More specifically, in the hinge-side trunk portion 462b, two first keyways 462d extending in the axial direction of the first axis member 131 are disposed with an interval of 180°. On an inner peripheral face of the first opening 464a, a first key 464b corresponding to the first keyway 462d is provided integrally. Thus, the body-side trunk portion 462a of the first axis member 131 is made to be unrotatable in the circumferential direction of the first axis member 131 if being inserted into the first opening 464a. That is, the first opening 464a has a shape such that the hinge-side trunk portion 462b is inserted and the rotation of the inserted hinge-side trunk portion 462b is regulated in the first axis member 131.

The hinge-side trunk portion 462b of the first axis member 131 is movable in the axial direction of the first axis member 131; however, if it is sufficiently pressed into the end side of the first opening 464a, it is in a pressed-in state, and the axial movement is also regulated.

The first axis member 131 also functions as a rotating component biasing the operation unit side body 2 in a direction to open the display unit side body 3 about the opening-and-closing axis X. That is, the first axis member 131 is configured such that, if the hinge-side trunk portion 462b is rotated with respect to the body-side trunk portion 462a, the biasing force to rotate the hinge-side trunk portion 462b in the opposite direction is generated.

More specifically, in the maximum extended state of the cellular telephone 1, the hinge-side trunk portion 462b is not rotated with respect to the body-side trunk portion 462a, and the biasing force by the first axis member 131 is not substantially generated. Here, the "maximum extended state" indicates a state in which the display unit side body 3 and the operation unit side body 2 are extended to the maximum. In addition, the "maximum extended state" indicates a state in which, in a configuration providing an extension regulating member (rear cover 170), which will be described later, the maximum extension is made without the extension regulating member attached.

On the other hand, in a state closer to the closed state rather than the maximum extended state, the biasing force by the first axis member 131 is generated. Particularly, in the closed state, the biasing force with a magnitude sufficient to change the cellular telephone 1 from the closed state to the open state is generated.

The one end 111 of the second connecting component 461 has a stepped shape. The stepped shape is formed by a large diameter portion 465b with a large outer diameter formed on the inner side portion in a direction along the opening-and-closing axis X in the one end 111 and a small diameter portion 465c with a small outer diameter formed on the outer side portion in the direction along the opening-and-closing axis X in the one end 111. On an outer periphery of the small diameter portion 465c, the cylindrical member 130 is inserted from the outside.

The cylindrical member 130 is used for improving the slidability of the second connecting component 461 with respect to the bearing face 211 of the operation unit side body 2. Therefore, the cylindrical member 130 is preferably formed from a material with low sliding resistance. Polyacetal (POM), for example, can be given as such a material.

An outer diameter of the cylindrical member 130 and an outer diameter of the large diameter portion 465b of the second connecting component 461 are substantially the same. A second key 465d extending from a boundary between the large diameter portion 465b and the small diameter portion 465c in a direction to the outside of the opening-and-closing axis X is provided integrally in the large diameter portion 465b. In addition, a second key way 463a cut out corresponding to the second key 465d is provided in an inner end portion (end portion inside the direction along the opening-and-closing axis X) of the cylindrical member 130. By engaging the second key 465d with the second keyway 463a, the cylindrical member 130 is prevented from rotating in the circumferential direction with respect to the large diameter portion 465b. As a result, the cylindrical member 130 slides with respect to the second connecting component 461, by which the sliding performance of the second connecting component 461 is ensured with respect to the bearing face 211.

The second connecting component 461 has the first connecting hole 151 and the second connecting hole 152 through which the threaded member S1 and the threaded member S2 used in fixing by threads are inserted, respectively. In addition, the second connecting component 461 has the open portion 466 in which insertion portions for the threaded member S1 and the threaded member S2 into the first connecting hole 151 and the second connecting hole 152, respectively, are opened. That is, in the second connecting component 461, the interval between the cylindrical other end 112 and the cylindrical one end 111 is not cylindrical, but is the open portion 466 opened to the surface 2A side of the operation unit side body 2 in the open state. The first connecting hole 151 and the second connecting hole 152 are provided separately in the open portion 466 on the side not opened in the direction along the opening-and-closing axis X. The first connecting hole 151 and the second connecting hole 152 are disposed at positions corresponding to the first threaded hole 124a and the second threaded hole 124b in the connecting plate 121, respectively.

The threaded member S1 and the threaded member S2 are inserted from the open portion 466 of the second connecting component 461 and threaded in the first threaded hole 124a and the second threaded hole 124b in the connecting plate 121 located on the side opposite to the open portion 466 in the second connecting component 461, by which the connecting plate 121 and the second connecting component 461 are connected to each other.

The insertion direction (screw insertion direction for fixing by threads) of the threaded member S1 and the threaded member S2 into the first connecting hole 151 and the second connecting hole 152, respectively, matches the direction in which the display unit side body 3 and the operation unit side body 2 overlap each other. The open portion 466 is formed at a position not obstructed by the display unit side body 3 and the operation unit side body 2 in the second connecting component 461 in the state (closed state) in which the display unit side body 3 and the operation unit side body 2 are closed about the opening-and-closing axis X. Thus, the threaded member S1 and the threaded member S2 are capable of being fastened in the closed state and in a state in which the rear cover 170 has been removed.

The open portion 466 in the second connecting component 461 has a size through which the second connector 473 of the cable 407 can be inserted. In a space from the second opening 465a to the open portion 466, the continuous space 467 through which the second connector 473 is inserted is formed.

A working method of the second connecting component 461 is not particularly limited; however, from the viewpoint of ensuring the strength and ease in the processing thereof, molding by die casting or metal sintering is preferable.

The connecting plate 121 and the second connecting component 461 (including the open portion 466) connected by way of fixing by threads using the threaded member S1 and the first threaded hole 124a, and the threaded member S2 and the second threaded hole 124b are, as shown in FIGS. 18A and 18B, covered by the hinge case 150. Described in detail, the connected connecting plate 121 and the second connecting component 461 have the front side and the back side of the hinge portion 4 covered by the front cover 160 and the rear cover 170, respectively. That is, the hinge case 150 is composed of the front cover 160 and the rear cover 170.

A width of the hinge case 150 (a width in the direction along the opening-and-closing axis X) is slightly smaller than a width of the fitting portion 230 (a width in the direction along the opening-and-closing axis X) of the operation unit side body 2.

The other end 112 and the one end 111 in the second connecting component 461 protrude from the hinge case 150. The hinge portion 4 is connected to the base end portion of the operation unit side body 2 on the opening-and-closing axis member 110 side by means of the other end 112 and the one end 111 protruding from the hinge case 150.

In the cellular telephone 1 of the present embodiment, in the state in which the hinge case 150 is fitted into the fitting portion 230, the first opening 464a and the bearing face 221 are disposed so as to oppose each other adjacently and the second opening 465a and the bearing face 211 are disposed so as to oppose each other adjacently. In addition, the first opening 464a and the bearing face 221 are connected by the first axis member 131 inserted into both. The second opening 465a and the bearing face 211 are connected by the one end 111 fitted into the bearing face 211. As mentioned above, the operation unit side body 2 and the display unit side body 3 are connected so as to be openable and closable about the opening-and-closing axis X.

The rear cover 170 also functions as an extension regulating member that regulates the display unit side body 3 and the operation unit side body 2 so that they are not extended to the maximum extended state. That is, in a state in which the rear cover 170 is not attached, the display unit side body 3 can be opened substantially linearly (180°) with respect to the operation unit side body 2. On the other hand, in a state in which the rear cover 170 is attached, even if the display unit side body 3 is to be opened to the maximum extended state with respect to the operation unit side body 2, since the outer face of the rear cover 170 abuts the operation unit side body 2, the display unit side body 3 cannot be opened to the maximum extended state.

The hinge portion 4 is configured so as to allow sliding of the first axis member 131 from the bearing face 221 to the first opening 464a in a state in which the rear cover 170 as the extension regulating member is not attached. On the other hand, the hinge portion 4 is configured so that the sliding of the first axis member 131 from the first opening 464a to the bearing face 221 is prevented in the state in which the rear cover 170 is attached. The above configuration is realized by employing a "configuration in which the planar portion of the bearing face 221 in the second bearing portion 220 of the operation unit side body 2 matches the position of the first key 464b in the first opening 464a of the second connecting component 461 in the maximum extended state, but the planar portion and the first key 464b are misaligned in the state offset from the maximum extended state".

Next, the correcting means will be explained referring to FIGS. 11A to 12. FIG. 11A is a front view illustrating the cellular telephone 1 of the embodiment in the first closed state, in which the tip portion of the operation unit side body 2 and the tip portion of the display unit side body 3 are positionally misaligned. FIG. 11B is a view illustrating a state in which there is no positional misalignment between the tip portion of the operation unit side body 2 and the tip portion of the display unit side body 3. FIG. 12 is a partially enlarged sectional view of an abutting portion between the connecting plate 121 and the second connecting component 461.

In a case where the cellular telephone 1 of the present embodiment is assembled to a state shown in FIGS. 14A and 14B, i.e. in a state in which the display unit side body 3 and the operation unit side body 2 are connected by the hinge portion 4 (the front cover 160 is attached but the rear cover 170 is not attached), as shown in FIG. 11B, when the tip portion of the display unit side body 3 and the tip portion of the operation unit side body 3 are not positionally misaligned, the cellular telephone 1 can be completed by attaching the rear cover 170.

However, as shown in FIG. 11A, in a case where the tip portion of the display unit side body 3 and the tip portion of the operation unit side body 2 are positionally misaligned, the positional misalignment between the tip portion of the display unit side body 3 and the tip portion of the operation unit side body 3 needs to be corrected by correcting the positional relationship between the rotational axis member 120 and the opening-and-closing axis member 110.

In the present embodiment, in a closed state in which the display unit side body 3 and the operation unit side body 2 are folded about the opening-and-closing axis X, the degree of fastening of the screw connecting the connecting plate 121 and the second connecting component 461 can be changed. In addition, on both the abutting portion with the second connecting component 461 in the connecting plate 121 and the abutting portion with the connecting plate 121 in the second connecting component 461, the "correcting means for correcting the positional relationship between the rotational axis member 120 and the opening-and-closing axis member 110 by changing the degree of fastening of the screw" is formed. More specifically, the first adjustment projection portion 127 and the second adjustment projection portion 128 protruding to the second connecting component 461 side are provided on the connecting plate 121. In addition, the first adjustment concaved portion 114 and the second adjustment concaved portion 115 concaved to the side opposite to the connecting plate 121 are provided in the second connecting component 461.

The first adjustment concaved portion 114 and the second adjustment concaved portion 115 have a concaved shape corresponding to the shape of the first adjustment projection portion 127 and the second adjustment projection portion 128 in the projecting direction, respectively. Therefore, in the state in which the connecting plate 121 and the second connecting component 461 are fastened by way of fixing by threads, the first adjustment projection portion 127 and the second adjustment projection portion 128 as well as the first adjustment concaved portion 114 and the second adjustment concaved portion 115 are brought into contact with each other. More specifically, as shown in FIG. 12, the first adjustment concaved portion 114 and the second adjustment concaved portion 115 formed on the second connecting component 461 have the inclined face 114a and the inclined face 115a, respectively. In addition, the end portion 127a of the first adjustment projection portion 127 and the end portion 128a of the second adjustment projection portion 128 abut the inclined face 114a and the inclined face 115a, respectively.

For example, as shown in FIGS. 11A and 11B, for the cellular telephone 1 in the first closed state, in a state in which the tip portion (end portion on the side opposite to the hinge portion 4) of the display unit side body 3 is disposed on the upper front side, and the base end portion (end portion on the hinge portion 4 side) of the display unit side body 3 is disposed on the lower front side, the tip portion of the display unit side body 3 is assumed to be misaligned (inclined) to the left side (see FIG. 11A).

In such a state, the degree of fastening of the threaded member S1 on the right side (the side opposite to the side in which the tip portion of the display unit side body 3 is inclined) is increased. As a result, force is applied in the direction in which the first adjustment projection portion 127 is brought close to the first adjustment concaved portion 114 and the first adjustment projection portion 127 and the first adjustment concaved portion 114 are displaced from each other. For example, the force is applied in the direction in which the end portion 127a of the first adjustment projection portion 127 climbs the inclined face 114a.

Here, since the second connecting component 461 is connected to the operation unit side body 2 and does not substantially move to the operation unit side body 2, the connecting plate 121 is relatively moved to the operation unit side body 2. As a result, the connecting plate 121 is brought close to the lower front side (hinge portion 4 side) in FIGS. 11A and 11B. Furthermore, since the left threaded member S2 is fixed, the connecting plate 121 is rotated clockwise around the vicinity of the left threaded member S2 and the rotational axis member 120 and the display unit side body 3 fixed to the rotational axis member 120 are also rotated clockwise. As a result, the tip portion of the display unit side body 3 is moved in a direction to reduce the positional misalignment. Therefore, by setting the degree of fastening of the screw appropriately, the positional misalignment between the tip portion of the display unit side body 3 and the tip portion of the operation unit side body 2 can be corrected.

In order to move the tip portion of the display unit side body 3 in the direction opposite to the above example, it is only necessary to further fasten the threaded member S2 on the side (left side) opposite to the above example.

Depending on the case, the positional misalignment may be corrected by fastening both of the threaded members S1 and S2. Alternatively, the positional misalignment can be corrected by loosening the fastening of the screw.

According to the cellular telephone 1 of the present embodiment, the following effects are exerted.

In the cellular telephone 1 of the present embodiment, in the closed state in which the display unit side body 3 and the operation unit side body 2 are folded about the opening-and-closing axis X, the degree of fastening of the screw connecting the connecting plate 121 and the second connecting component 461 can be changed. In addition, the first adjustment projection portion 127 and the second adjustment projection portion 128 as well as the first adjustment concaved portion 114 and the second adjustment concaved portion 115 are formed, respectively, on the abutting portion with the second connecting component 461 in the connecting plate 121 and the abutting portion with the connecting plate 121 in the second connecting component 461.

As a result, with the above-mentioned procedure, the positional relationship between the display unit side body 3 fixed to the rotational axis member 120 and the operation unit side body 2 fixed to the opening-and-closing axis member 110 can be corrected, and the positional misalignment between the tip portions of both of the bodies 3 and 2 can be easily prevented.

In addition, since the connecting plate 121 and the second connecting component 461 are configured to be connected by way of fixing by threads, the strength of the hinge portion 4 can be sufficiently ensured while the size and thickness of the entire cellular telephone 1 can be reduced.

Furthermore, since the connecting plate 121 and the second connecting component 461 can be manufactured separately, restrictions on the shapes in manufacture are few and an order can be placed from separate manufacturers suitable for the respective manufacture, which can reduce component costs and moreover, facilitate earlier delivery.

The connecting plate 121 and the second connecting component 461 are connected by way of fixing by threads of the threaded member S1 and the first threaded hole 124a as well as the threaded member S2 and the second threaded hole 124b at two symmetrical positions about the axial direction of the pivot axis X. As a result, by fastening either one of the threaded member S1 and the other threaded member S2, an angle of the display unit side body 3 with respect to the operation unit side body 2 can be adjusted with similar operability.

In a case where the frame 122 and the connecting plate 121 are molded by sheet-metal working, and the second connecting component 461 is molded by die casting or metal sintering, there is no need to connect the resin molded component and the sheet-metal worked component by riveting or welding, and deformation of components of the hinge portion 4 in connecting working can be prevented. By means of the sheet-metal working, die casting and metal sintering, components can be formed in simple shapes, working accuracy can be improved, and a manufacturing cost can be curbed.

In addition, the second connecting component 461 has the first connecting hole 151 and the second connecting hole 152 through which the threaded member S1 and the threaded member S2 used for fixing by threads penetrate, respectively. The second connecting component 461 is formed cylindrically to have the open portion 466 in which the insertion portion for the threaded member S1 and the threaded member S2 into the first connecting hole 151 and the second connecting hole 152, respectively, is opened. In addition, in the connecting plate 121, the first threaded hole 124a and the second threaded hole 124b forming pairs with the threaded member S1 and the threaded member S2, respectively, are formed. In addition, by inserting the threaded member S1 and the threaded member S2 from the open portion 466 of the second connecting component 461 and threading them into the first threaded hole 124a and the second threaded hole 124b in the connecting plate 121 located on the side opposite to the open portion 466 of the second connecting component 461, the connecting plate 121 and the second connecting component 461 are connected to each other. As a result, the threaded member S1 and the threaded member S2 can be inserted from the open portion 466 of the second connecting component 461 and can be easily fastened to the first threaded hole 124a and the second threaded hole 124b of the connecting plate 121 through the first connecting hole 151 and the second connecting hole 152, respectively, by which wiring workability is made superior.

In addition, the cable 407 is inserted into the second axis member 123, which is the connection portion, and the second connector 473 is connected to the end portion on the operation unit side body 2 in the cable 407. Moreover, the open portion 466 of the second connecting component 461 has a size that allows the second connector 473 to be inserted therethrough. Furthermore, the cylindrical second connecting component 461 has the second opening 465a on the other side of the second connecting component 461. In addition, in the space from the second opening 465a to the open portion 466, the continuous space 467 through which the second connector 473 is inserted is formed. As a result, in a state in which the first connector 472 connected to the end portion on the display unit side body 3 in the cable 407 is connected to an electronic component of the display unit side body 3 side, the wiring portion 471 of the cable 407 can be inserted through the second axis member 123. In addition, in a state in which the second connector 473 is located on the open portion 466 side of the second connecting component 461, the second connector 473 can be disposed within the operation unit side body 2 through the open portion 466, the continuous space 467, and the second opening 465a.

In addition, the open portion 466 is formed at a position not closed by the display unit side body 3 and the operation unit side body 2 in the second connecting component 461 in a state in which the display unit side body 3 and the operation unit side body 2 are closed about the opening-and-closing axis X. Moreover, the insertion direction of the threaded member S1 with respect to the first connecting hole 151 and the second connecting hole 152 matches the direction in which the display unit side body 3 and the operation unit side body 2 overlap each other. Therefore, in a state in which the display unit side body 3 and the operation unit side body 2 are closed about the opening-and-closing axis X, the threaded members S1 and S2 can be easily fastened to the first threaded hole 124a and the second threaded hole 124b of the connecting plate 121 through the first connecting hole 151 and the second connecting hole 152 of the second connecting component 461, respectively.

Next, a second embodiment of the present invention will be explained. Aspects different from the above embodiment will be mainly explained for the second embodiment. The same reference numerals are assigned to similar configurations as the above embodiment, and the explanations thereof will be omitted. For aspects not particularly explained in the second embodiment, the explanation for the above embodiment will be applied as appropriate. According to the second embodiment, the same effects as to the above embodiment are exerted.

Figure 22:
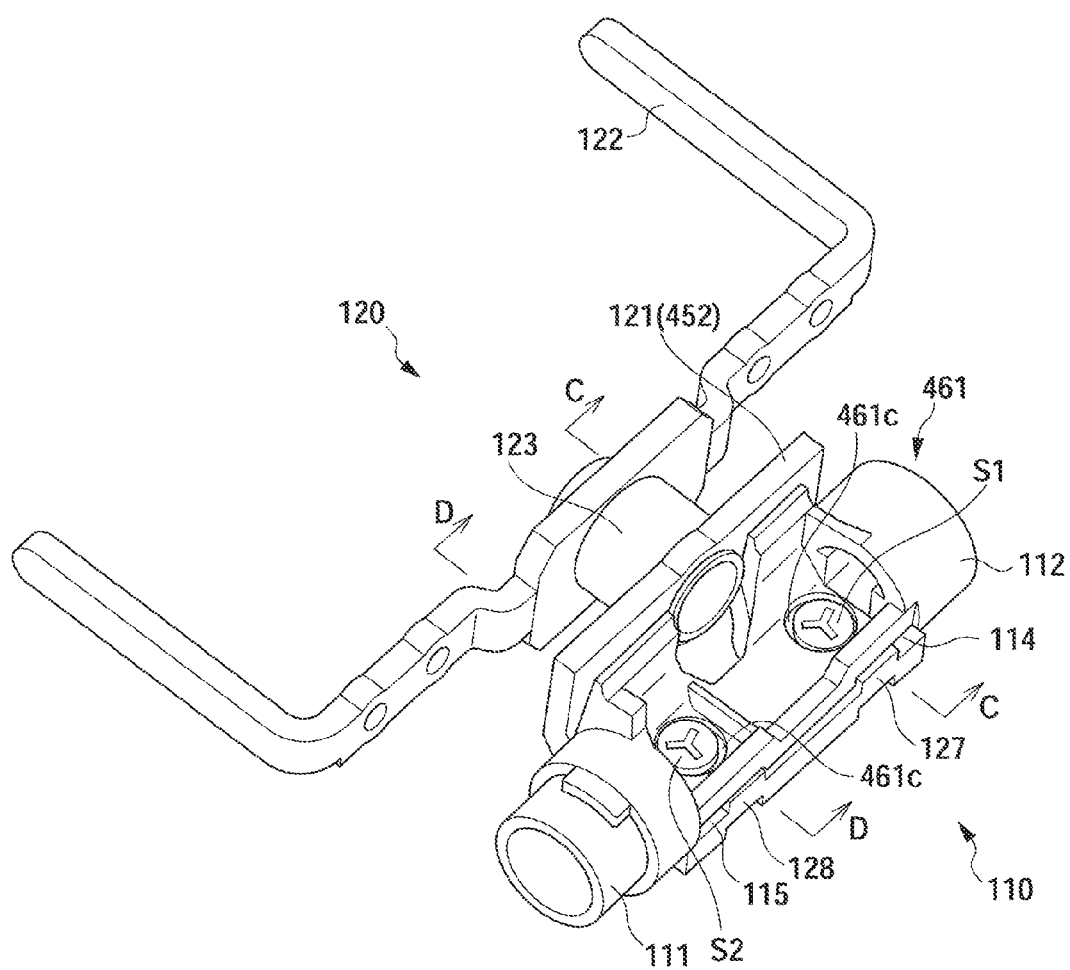
FIG. 22 is a perspective view illustrating the hinge portion 4 in a cellular telephone of a second embodiment of the present invention.
Figure 23:
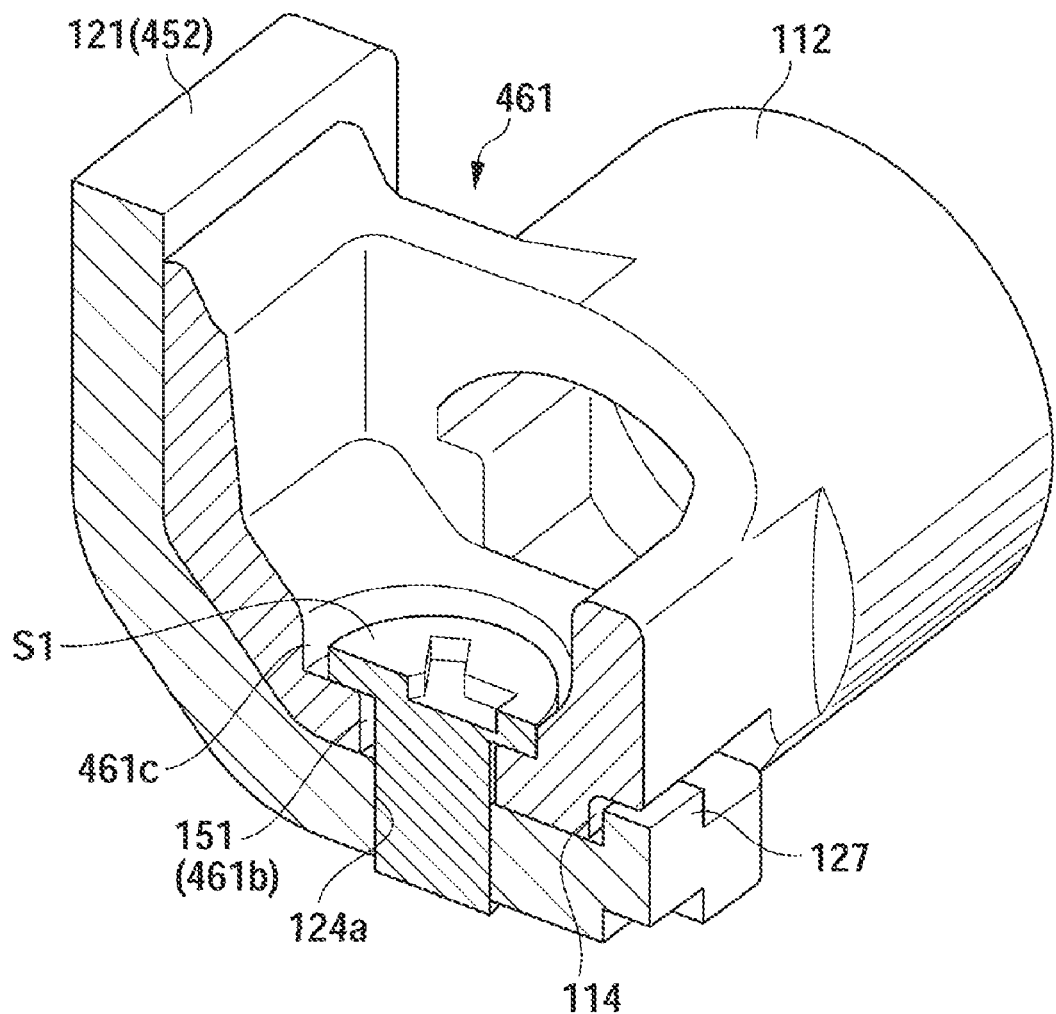
FIG. 23 is a sectional perspective view sectioned along the line C-C shown in FIG. 22.
Figure 24:
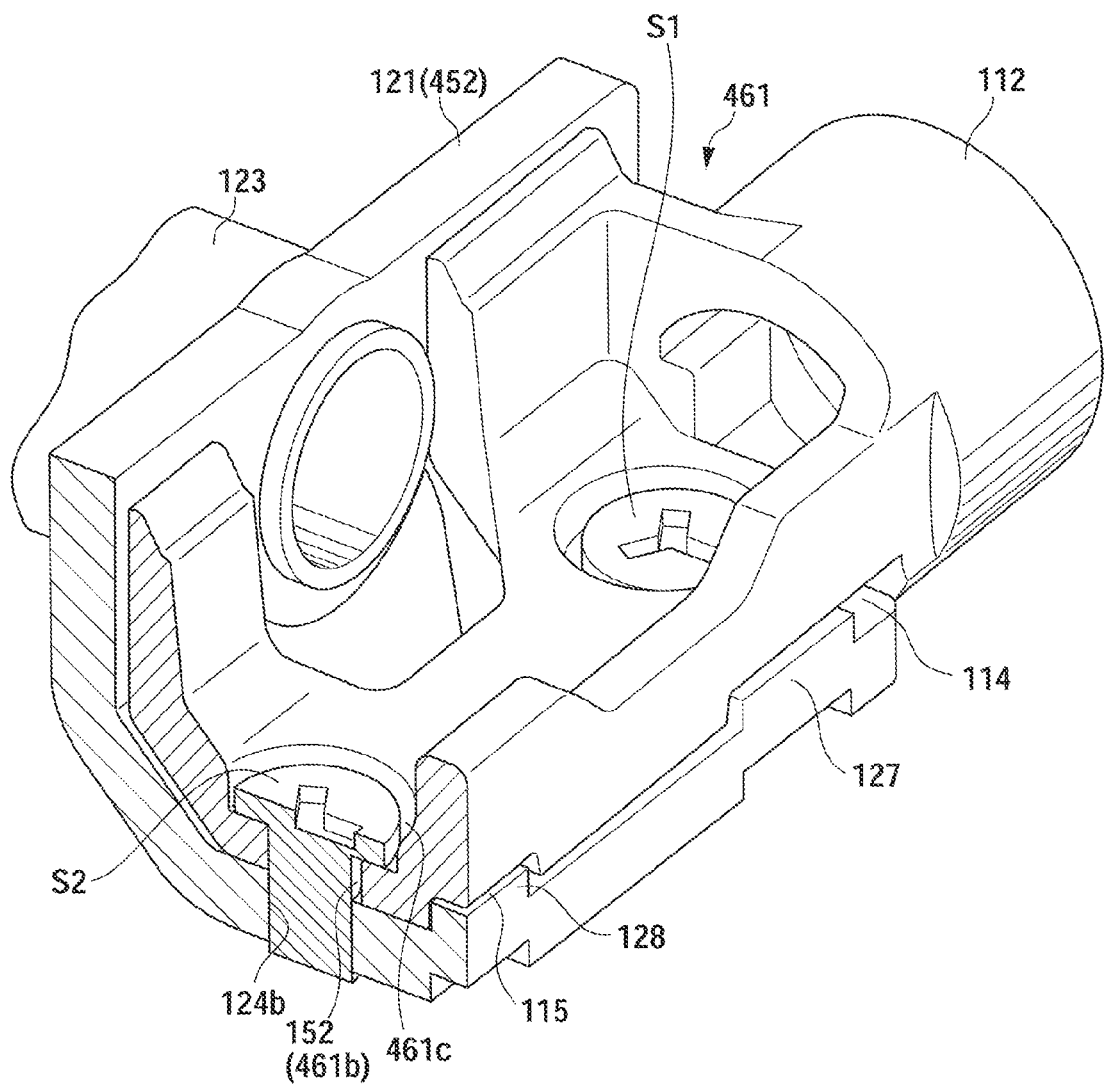
FIG. 24 is a sectional perspective view sectioned along the line D-D shown in FIG. 22.

FIG. 22 is a perspective view illustrating the hinge portion 4 in a cellular telephone of the second embodiment of the present invention. FIG. 23 is a sectional perspective view sectioned along the line C-C shown in FIG. 22. FIG. 24 is a sectional perspective view sectioned along the line D-D shown in FIG. 22.

The cellular telephone of the second embodiment is different from the above embodiment mainly in the shapes of the first adjustment concaved portion 114 and the second adjustment concaved portion 115. More specifically, in the second embodiment, as shown in FIGS. 22 to 24, the first adjustment projection portion 127 and the second adjustment projection portion 128 have a cross-sectional shape of a rectangle similarly to the first adjustment projection portion 127 and the second adjustment projection portion 128 in the above embodiment. On the other hand, the first adjustment concaved portion 114 and the second adjustment concaved portion 115 have a substantially cross-sectional shape that is substantially rectangular not having the inclined face 114a and the inclined face 115, unlike the first adjustment concaved portion 114 and the second adjustment concaved portion 115 in the above embodiment. More specifically, the first adjustment concaved portion 114 and the second adjustment concaved portion 115 have shapes offset by the first adjustment projection portion 127 and the second adjustment projection portion 128.

Therefore, in a case where the components of the biaxial hinge mechanism are manufactured in compliance with the design dimensions, i.e. in a case where there is no positional misalignment generated between the tip portion of the display unit side body 3 and the tip portion of the operation unit side body 2 without correcting the positional relationship between the rotational axis member 120 and the opening-and-closing axis member 110, the first adjustment projection portion 127 and the second adjustment projection portion 128 and the first adjustment concaved portion 114 and the second adjustment concaved portion 115 are sufficiently separated from each other. Gaps between the first adjustment projection portion 127 and the second adjustment projection portion 128 and the first adjustment concaved portion 114 and the second adjustment concaved portion 115 can generate looseness between the components; however, by sufficiently fastening the threaded member S1 and the threaded member S2 with the first threaded hole 124a and the second threaded hole 124b, respectively, so as to generate a friction force of sufficient magnitude between the connecting plate 121 and the contact face of the second connecting component 461, the looseness between the components can be suppressed to a degree not causing a problem in use.

In order to suppress the looseness between the components relying on the fastening force of the screws as above, friction force with a sufficient size needs to be generated between the connecting plate 121 and the second connecting component 461. As a means to increase such a large friction force, the surface of the contact face can be made coarse or a nominal diameter of the screw can be increased, for example.

In addition, the first connecting hole 151 and the second connecting hole 152 are composed of the small diameter portion 461b corresponding to shank portions (threaded portions) of the threaded members S1 and S2 and the large diameter portion 461c corresponding to the head portions of the threaded members S1 and S2. The small diameter portion 461b has play (clearance) with a sufficient size with respect to the shank portions of the threaded members S1 and S2. Similarly, the large diameter portion 461c has play with a sufficient size with respect to the head portions of the threaded members S1 and S2.

The first adjustment projection portion 127 and the second adjustment projection portion 128 play a role of positioning (positioning before screw fastening) of the second connecting component 461 to the connecting plate 121. In addition, the first adjustment projection portion 127 and the second adjustment projection portion 128 also play a role of preventing the second connecting component 461 from moving more than necessary (excessively) due to the play generated since the diameters of the first connecting hole 151 and the small diameter portion 461b of the second connecting hole 152 are larger than the diameters of the threaded member S1 and the threaded member S2 when the second connecting component 461 is to be moved with respect to the connecting plate 121.

The positional misalignment between the tip portion of the display unit side body 3 and the tip portion of the operation unit side body 2 is mainly caused by inclination of the rotational axis member 120 and the opening-and-closing axis member 110 due to variation in the dimensions of the components of the biaxial hinge mechanism. Therefore, even if the positional relationship between the rotational axis member 120 and the opening-and-closing axis member 110 is normal, if there is variation in the dimensions of the components themselves of the rotational axis member 120 and/or the opening-and-closing axis member 110, the positional misalignment might be caused between the tip portions of both of the bodies 3 and 2. The cellular telephone of the second embodiment absorbs the variation in the dimensions of the components in the biaxial hinge mechanism using the gaps between the above-mentioned first adjustment concaved portion 114 and the second adjustment concaved portion 115 and the first adjustment projection portion 127 and the second adjustment projection portion 128, respectively.

It should be noted that the degree (size) of the gaps between the first adjustment concaved portion 114 and the second adjustment concaved portion 115 and the first adjustment projection portion 127 and the second adjustment projection portion 128, respectively, is set on the basis of an allowable range (tolerance) of the positional misalignment between the tip portion of the display unit side body 3 and the tip portion of the operation unit side body 2.

According to the cellular telephone of the second embodiment, the positional misalignment between the tip portions of both of the bodies 3 and 2 can be easily prevented by the procedure shown below, for example.

For example, in a state in which the threaded member S1 and the threaded member S2 are temporarily fastened to the first threaded hole 124a and the second threaded hole 124b (the state in which the inclination of the rotational axis member 120 and the opening-and-closing axis member 110 can be adjusted), the positional misalignment between the tip portions of both of the bodies 3 and 2 is regulated (adjusted) by holding the tip portions of both of the bodies 2 and 3 with a jig (not shown) and changing the inclination with respect to the rotational axis member 120 and the opening-and-closing axis member 110. As a result, as shown in FIG. 23, for example, the first adjustment concaved portion 114 of the second connecting component 461 on the right threaded member S1 side is moved in a direction separated from the corresponding first adjustment projection portion 127. On the other hand, as shown in FIG. 24, the second adjustment concaved portion 115 of the second connecting component 461 on the left threaded member S2 side is moved in a direction approaching the corresponding second adjustment projection portion 128.

In this state, by firmly fastening the threaded member S1 with the first threaded hole 124a and the threaded member S2 with the second threaded hole 124b, the positional relationship between the connecting plate 121 and the second connecting component 461, and the positional relationship between the rotational axis member 120 and the opening-and-closing axis member 110 can be corrected. As mentioned above, in the second embodiment as well, the positional relationship between the display unit side body 3 fixed to the rotational axis member 120 and the operation unit side body 2 fixed to the opening-and-closing axis member 110 can be corrected, and positional misalignment between the tip portions of both of the bodies 3 and 2 can be easily prevented.

The present invention is not limited to the embodiments described above, and may be modified as appropriate. For example, in the above embodiment, the correcting means is composed of the first adjustment projection portion 127 and the second adjustment projection portion 128 provided to the connecting plate 121 and the first adjustment concaved portion 114 and the second adjustment concaved portion 115 provided in the second connecting component 461; however, the correcting means is not limited thereto, and may be composed of an adjustment projection portion provided the second connecting component 461 and an adjustment concaved portion provided to the connecting plate 121.

In addition, the correcting means may be provided only to either one of the connecting plate 121 or the second connecting component 461. For example, the correcting means can be composed of the adjustment projection portion provided to the connecting plate 121 and a plane to abut the adjustment projection portion on the second connecting component 461, or to the contrary, the means can be composed of the adjustment projection portion provided to the second connecting component 461 and the plane to abut the adjustment projection portion on the connecting plate 121.

In addition, a contact face between the adjustment projection portion and the adjustment concaved portion or the plane is not limited to the direction orthogonal to the fastening direction of the threaded member S1 and the threaded member S2 with the first threaded hole 124a and the second threaded hole 124b, and may be inclined with respect to the orthogonal direction, for example.

The present invention may not include the correcting means if the degree of fastening of the screw connecting the first connecting component and the second connecting component can be changed in the closed state in which the first body and the second body are folded about the first rotational axis (opening-and-closing axis X).

In addition, in the first embodiment, although a folding type cellular telephone having the biaxial hinge mechanism was explained, the present invention is not limited thereto, and may be a folding type cellular telephone having a monoaxial hinge mechanism or the like.

The present invention can be applied to portable electronic apparatuses other than a cellular telephone, including a PHS (registered trademark: Personal Handy phone System), a portable game machine, a portable navigation system, a PDA (Personal Digital Assistant), a laptop computer, an EL display provided with an operating portion or a liquid crystal display.

The invention claimed is:

1. A portable electronic apparatus comprising:
   a first body;
   a second body; and
   a hinge portion that connects the first body and the second body so as to be openable and closable around a first rotational axis and to be rotatable around a second rotational axis orthogonal to the first rotational axis,
   wherein the hinge portion includes a first body fixing component fixed to the first body, a first connecting component connected to the first body fixing component so as to be rotatable around the second rotational axis, and a second connecting component connected to the second body so as to be rotatable around the first rotational axis and is configured by the first connecting component and the second connecting component connected to each other by screwing; and
   in a closed state in which the first body and the second body are folded with respect to the first rotational axis, a degree of fastening a screw connecting the first connecting component and the second connecting component can be changed.

2. The portable electronic apparatus according to claim 1, wherein a correction means for correcting a positional relationship of the first connecting component and the second connecting component by changing a degree of fastening degree of the screw is formed on at least either one of an abutting portion of the first connecting component with the second connecting component and an abutting portion of the second connecting component with the first connecting component.

3. The portable electronic apparatus according to claim 1, wherein the first connecting component and the second connecting component are connected by way of the fixing by threads in at least two symmetrical positions about an axial direction of the second rotational axis.

4. The portable electronic apparatus according to claim 1, wherein the first body fixing component and the first connecting component are formed by sheet-metal working, and
   wherein the second connecting component is formed by die casting or metal sintering.

5. The portable electronic apparatus according to claim 1, wherein the hinge portion has an open portion in which an insertion portion of the screw is opened, and the open portion is covered by a cover member.

6. The portable electronic apparatus according to claim 5, wherein:
   a hole portion through which male threads used for the fixing by threads penetrate and the open portion are formed in the second connecting component;
   female threads that match with the male threads are formed in the first connecting component; and
   the first connecting component and the second connecting component are connected by inserting the male threads into the hole portion from the open portion of the second connecting component and threading with the female threads of the first connecting component.

7. The portable electronic apparatus according to claim 6, further comprising a cable that electrically connects an electronic component in the first body and an electronic component in the second body, wherein:
   the second rotational axis is located at a connection portion of the first body fixing component and the first connecting component;
   the cable is inserted into the connection portion and has a connector at an end portion on a side of the second body in the cable;
   the open portion of the second connecting component has a size that allows the connector to be inserted therethrough;
   the second connecting component is cylindrical and fixed to one end side of the second connecting component a rotating component which biases the second body in a direction to open the first body about the first rotational axis, such second connecting component has an opening on an other side of the second connecting component; and
   a continuous space through which the connector is inserted is formed in a space from the opening to the open portion.

8. The portable electronic apparatus according to claim 5, wherein the open portion is formed at a position not obstructed by the first body and the second body in the second connecting component, in the closed state.

9. The portable electronic apparatus according to claim 1, wherein the insertion direction of the screw for fixing by threads matches a direction in which the first body and the second body overlap.

10. The portable electronic apparatus according to claim 1, wherein:
the hinge portion is covered by a cover member;
the second body has a first bearing portion and a second bearing portion at the end portions thereof that separately protrude and pivotally support the second connecting component rotatably about the first rotational axis;
the second body has a fitting portion between the first bearing portion and the second bearing portion, in which the hinge portion covered by the cover member is disposed;
on the surfaces of the fitting portion and the cover member, a first abutment portion and a second abutment portion to be abutted in the open state are respectively formed; and
at least a part of a back side of the second abutment portion in the cover member is formed to be capable of abutting at least either one of the first connecting component and the second connecting component.

11. The portable electronic apparatus according to claim 10, wherein a first plane is formed on the first abutment portion;
a second plane is formed on the second abutment portion;
a third plane is formed on an abutting portion with the back face of the second abutment portion in the first connecting component or the second connecting component; and
the first plane, the second plane, and the third plane are formed to be capable of abutting in a state parallel with each other in the open state.

12. The portable electronic apparatus according to claim 10, wherein the cover member includes a first cover and a second cover; and
the first cover and the second cover are formed to be capable of being fitted by a fitting means formed on the first cover and the second cover, respectively, by sandwiching the hinge portion.

13. The portable electronic apparatus according to claim 10, wherein:
the first connecting component and the second connecting component are formed to be capable of assembly;
the hinge portion has an adjusting means that adjusts an assembling angle of the first connecting component and the second connecting component; and
the fitting means is formed so as to surround the adjusting means.

14. The portable electronic apparatus according to claim 13,
wherein the adjusting means includes a screw that fastens the first connecting component and the second connecting component, and
wherein an insertion direction of the screw matches a direction in which the first body and the second body overlap in the closed state.

* * * * *